United States Patent
Odagiri et al.

(10) Patent No.: US 6,888,648 B2
(45) Date of Patent: May 3, 2005

(54) METHOD AND APPARATUS FOR EXTRACTING COLOR SIGNAL VALUES, METHOD AND APPARATUS FOR CREATING A COLOR TRANSFORMATION TABLE, METHOD AND APPARATUS FOR CHECKING GRADATION MAINTAINABILITY, AND RECORD MEDIUM IN WHICH PROGRAMS THEREFOR ARE RECORDED

(75) Inventors: Junichi Odagiri, Kawasaki (JP); Satoshi Semba, Kawasaki (JP); Kimitaka Murashita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 978 days.

(21) Appl. No.: 09/802,997

(22) Filed: Mar. 12, 2001

(65) Prior Publication Data

US 2002/0047848 A1 Apr. 25, 2002

(30) Foreign Application Priority Data

Sep. 5, 2000 (JP) ........................................ 2000-269260

(51) Int. Cl.$^7$ ............................................. G06F 15/00
(52) U.S. Cl. ..................... 358/1.9; 358/500; 358/518; 358/521; 358/523; 382/162; 382/167
(58) Field of Search ................................. 358/1.9, 3.24, 358/500, 518, 501, 504, 521, 523, 537; 382/162, 167

(56) References Cited

U.S. PATENT DOCUMENTS 5,644,509 A * 7/1997 Schwartz ..................... 358/518
6,215,890 B1 * 4/2001 Matsuo et al. ............... 382/103
6,275,607 B1 * 8/2001 Shimizu et al. .............. 382/167
6,343,194 B1 * 1/2002 Shimada ....................... 399/28
6,512,845 B1 * 1/2003 Haikin et al. ................ 382/165
6,546,132 B1 * 4/2003 Bhattacharjya et al. ..... 382/167
6,657,746 B1 * 12/2003 Fuchigami et al. .......... 358/1.9

FOREIGN PATENT DOCUMENTS

JP        05-223642        8/1993

* cited by examiner

Primary Examiner—Kimberly Williams
Assistant Examiner—Tia A Carter
(74) Attorney, Agent, or Firm—Staas & Halsey LLP

(57) ABSTRACT

A method enabling checks on correctness of color signal values and an extracting region, which comprises a region deciding step of deciding an extracting region for each color region of a color chart image, an extracting step of calculating a representative color signal value of the color region, a displaying step of making a display unit display the extracting region along with the color chart image, and a determining step of determining correctness of the representative color signal value on the basis of the extracting region and the color chart image displayed on the display unit. This invention is applied when a color transformation table for a color input device such as a color scanner is created, when gradation maintainability of a color input device such as a color scanner is checked, and when a color transformation table for a color output device such as a color printer is created.

34 Claims, 21 Drawing Sheets

FIG. 9

INPUT THE NUMBER OF PATCHES
THE NUMBER IN THE X DIRECTION [22] RATE OF OBTAINING IN THE X DIRECTION (0~1.0) [0.5]
THE NUMBER IN THE Y DIRECTION [12] RATE OF OBTAINING IN THE Y DIRECTION (0~1.0) [0.5]
CANCEL

FIG. 19

METHOD AND APPARATUS FOR EXTRACTING COLOR SIGNAL VALUES, METHOD AND APPARATUS FOR CREATING A COLOR TRANSFORMATION TABLE, METHOD AND APPARATUS FOR CHECKING GRADATION MAINTAINABILITY, AND RECORD MEDIUM IN WHICH PROGRAMS THEREFOR ARE RECORDED

BACKGROUND OF THE INVENTION

1) Field of the Invention

The present invention relates to a color signal value extracting method and apparatus for extracting color signal values (for example, RGB values or L*a*b* values) from an image (for example, an RGB image or an L*a*b* image) of a patch (color region) on a color chart when a color transformation table for a color input device such as a color scanner or the like is created, gradation maintainability of a color input device such as a color scanner or the like is checked, or a color transformation table for a color output device such as a color printer or the like is created, a color transformation table creating method and apparatus applied the color signal value extracting method and apparatus, a gradation maintainability checking method and apparatus, and a record medium in which programs therefor are recorded.

2) Description of the Related Art

A color transformation table is generally used to match color appearance between different color input/output devices when color signals are transformed into color signals in a different color space.

Here, the color space signifies a coordinate system expressing colors. There are various color spaces. A color printer (color output device), a color scanner (color input device) and the like have a color space (device-dependent color space) depending on a device such as CMY (cyan, magenta, yellow) or RGB (red, green, blue). In a color printer whose maximum value and a minimum value of color signal values are 0 and 255, for example, output colors thereof are expressed by values in each of CMY within a range from 0 to 255. L*a*b* or XYZ which are color spaces not depending on a device are also widely used other than the above device-dependent color space. The color space not depending on a device can express an absolute color space.

Color transformation is to transform a color signal value expressed in a certain color space into a color signal value expressed in a different color space. When such color transformation is performed between color spaces of different devices, the above color space (L*a*b*, XYZ or the like) not depending on a device is used as a color space intermediate between the above device-dependent color spaces. For example, when color appearance of a color original is matched with color appearance of a printed matter that is obtained by out putting, by a color printer, an RGB image obtained by reading the color original by a color scanner, color transformation is performed in the following procedures (1) and (2):

(1) The RGB image obtained by a color scanner is color-transformed into an image expressed in, for example, the L*a*b* system.

(2) The L*a*b* image obtained in (1) is transformed into CMY data for a color printer, and outputted by the color printer on the basis of the CMY data.

In the color transformation described in the above procedures (1) and (2), a color transformation table (profile) is used. In the color transformation table, relationship between different color spaces is registered. In color transformation, the relationship is used. When a color registered in the color transformation table, color transformation is performed in such a manner that the color transformation table is looked up to read relationship of the color registered in the color transformation table. When a color not registered in the color transformation table is transformed, an interpolation process is performed on the basis of data registered in the color transformation table to transform a desired color.

When a color transformation table for a color input device used in the above procedure (1) is created, a color chart that is an original in which a number of colors are uniformly shown is generally used. An a practical example of the color chart, there is an input color target (ANSI/IT8.7/2) according to ANSI (American National Standards Institute) standard.

An input color target shown in FIG. 29 has a color patch region including 264 color patches and a gray patch region (gray scale) including gray patches in different 24 gradation levels.

In more detail, the color patch region is a part used when a color transformation table is created, which is a matrix-like region of 12 rows (A–L) by 22 columns (1–22), formed with 264 rectangular patches (square color regions). In the color patch region, 144 colors in a region of the rows A–B by the columns 1–12 are color solid colors, 84 colors in a region of the rows A–L and the columns 13–19 are primary color scales of C, M, Y, K, R, G, and B, and 36 colors in the region of the rows A–L and the columns 20–22 are maker's original colors.

The gray patch region is a part used when gradation maintainability of the color input device is checked, formed with 24 continuous rectangular patches. A gradation level of each rectangular patch is set in such a manner as to change from a lower level to a higher level (or a higher level to a lower level) when seen from left to right.

When a color transformation table for a color input device is created, color patch groups in the above input color target are read by a color input device, then color signal values (RGB values) of each color patch are extracted from an RGB image of the color patch groups obtained by the color input device, in general. Measured values (L*a*b* values) of each color patch in the input color target are separately obtained. Then, relationship between color signal values and measured values is stored as a look-up table, whereby a color transformation table for the color input device is created.

When the gradation maintainability that is one of characteristics of the color input device is grasped and checked, a gray scale (gradation original) of the above input color target is read by a color input device, and color signal values (RGB values) of each gray patch are extracted from an RGB image of the gray scale obtained by the color input device, in general. Then, whether the color signal values change in order of the gradation level of the gray patches or not, that is, whether inversion of the color signal values generates or not, is examined.

When a color transformation table for a color input device is created or when gradation maintainability of a color input device is checked as above, a process of extracting color signal values from a patch image ready by the color input device needs to be frequently performed.

As a means for extracting color signal values, there is a technique disclosed in Japanese Patent Laid-Open Publication No. 5-223642, for example. The technique disclosed in the above publication is aimed to improve colorimetric accuracy when colorimetric values (L*a*b* values, XYZ values) of an object are measured, in which a color signal extracting means is disclosed. There is a calorimeter of a non-contact type used to measure colors of an object of colorimetry. Use of such calorimeter may introduce a danger of decreasing the colorimetric accuracy since reflected light from an object other than the object of colorimetry is contaminated. To solve this drawback, the technique disclosed in the above publication provides the following procedures (a) to (c):

(a) beforehand measuring colors of each patch in the standard color chart, and holding results of the measurement as RGB data;

(b) photographing an object of colorimetry and the standard color chart simultaneously or separately by a color input device, designating each patch (six colors in black, gray, white, blue, green and red) of the standard color chart in the obtained image on a screen of a display by a cursor, and extracting RGB data (color signal values) of the designated patch; and (c) obtaining a difference between the RGB data obtained beforehand in (a) and RGB data extracted from the standard color chart in (b), and compensating the object of colorimetry.

However, it is necessary to designate several tens to several hundreds of colors when a color transformation table is created or gradation maintainability is checked. Therefore, the color signal value extracting method (method in which a patch is designated by a cursor to extract color signal values) disclosed in the above publication requires a lot of time and labor to extract color signals from a number of color patch groups.

There is software for creating a color transformation table for a color input device (for example, ScanOpenICC by Hidelberg) commercially available as a means for creating a color transformation table for a color input device. In which, the user selects only four points in the corners of a color chart (input color target) in an image of the color chart read by a color input device, whereby color signal values of a number of patch groups are automatically obtained. The procedure for obtaining the color signal values are as follows:

(i) The user reads a color chart (for example, the input color target shown in FIG. 29) by a color input device. A color chart image obtained by reading is assumed to be accurately erected and free from any inclination.

(ii) The user designates four points in the corners (for example, C1, C2, C3 and C4 in FIG. 29) of the whole patch groups (color patches in 264 colors, or color patches and gray patches in 288 colors) in the color chart image to obtain coordinates of the image.

(iii) On the basis of the coordinates of the image in (ii), the software automatically obtains color signal values of each patch. Since a state of arrangement of the patch groups in the color chart is standardized, thus known, a position of each patch can be grasped on the basis of the known state of arrangement and the obtained coordinates of the image, and color signal values can be extracted and obtained from each patch on the basis of a result of the grasp.

When a color transformation table for a color output device used in the above procedure (2) is created, color signal values (RGB values or CMY values) are inputted to the color output device to output color patches having multicolor color patches corresponding to the color signal values from the color output device. Each color patch in the color chart outputted from the output device is measured by a colorimeter to obtain colorimetric values (L*a*b* values) of the color patch. Relationship between the color signal values inputted to the color output device with the colorimetric values obtained from each color patch is stored as a look up table, whereby a color transformation table for the color output device is created.

When a color transformation table for a color input device is created in the known color signal value extracting method (for example, the technique disclosed in the above publication), the following disadvantages arise.

(1) Since a large amount of relationship is required to create a color transformation table, it is necessary to extract a number of color signal values of an image obtained by reading patch groups in a color chart by a color input device and outputting, which leads to a considerable time and labor.

(2) When the number of extracted color signal values is large, there is a high possibility that the color signal values are correlated with colorimetric values in a wrong order.

(3) Even if patches in the same color are read, color signal values outputted from the color input device are quite different from pixel to pixel since the color signal values have been affected by characteristics of the device. For this, if color signal values of only one pixel is employed as values corresponding to colorimetric values, there is a danger of degradation of color transformation accuracy.

(4) Color signal values extracted from a region neighboring a patch in a different color are optically affected by the neighboring patch in a different color even if they are in a patch region in the same color. For this, if the color signal values are employed as values corresponding to colorimetric values, there is a danger of degradation of the color transformation accuracy.

Similarly, when gradation maintainability of a color input device is checked in the known color signal extracting method (for example, the method disclosed in the above publication), the following drawbacks arise.

(1) To grasp gradation maintainability, color signal values need to be extracted from a number of patches, which leads to a considerable time and labor.

(2) Even when patches in the same color are read, color signal values outputted from the color input device are quite different from pixel to pixel due to an effect of characteristics of the device. If evaluation is made using color signal values of only one pixel, there is a danger of degradation of evaluation accuracy of the gradation maintainability.

(3) Color signal values extracted from a region neighboring a patch in a different color are optically affected by the neighboring patch in a different color even in patch regions in the same color. If evaluation is made using such the color signal values, there is a danger of degradation of evaluation accuracy of the gradation maintainability.

In the above known software for creating a color transformation table for a color input device, the user recognizes a position of each patch by designating four points in the corners of a color chart image to automatically extract color signal values of each patch, based on that a relative positional relation of patch groups is known. This allows a color transformation table to be created readily.

However, the above software cannot check correctness of color signal values automatically extracted. The color transformation table is created without checking its correctness.

Particularly, if a position of a color chart is not strictly set when the color chart (for example, the input color target as shown in FIG. 29) is read by a color input device, the software might extract color signal values without accurately obtaining coordinates of the image of the patch groups. When the color chart is arranged on even small inclination, there is a possibility that a region of each patch from which color signal values are to be extracted by the software gets closer to a neighboring patch, which leads to noticeable degradation of accuracy of the color signal values. The known software has no means or measure to confirm a region from which color signal values have been extracted, thus a color transformation table is created without confirming the region.

Use of such the software for creating a color transformation table for a color input device allows easy extraction of color signal values and creation of a color transformation table. However, the software cannot check whether the color signal values are accurately extracted, so that accuracy or reliability of the created color transformation table (accuracy of color transformation) might degrade. Similarly, even if color signal values are extracted from a gray scale of the color chart using the software and the gradation maintainability is checked, it is impossible to check whether the color signal values have been accurately obtained or not although extraction of the color signal values is simple. This leads to degradation of the accuracy of such checking (evaluation accuracy).

Alternatively, it is possible to strictly set a position of a color chart when the color chart is read. In such case, setting of a position of the color chart is troublesome, which obstructs easy creation of a color transformation table or easy checking of gradation maintainability.

On the other hand, in the known method for creating a color transformation table for a color output device, it is necessary to measure patches in several hundreds of colors in a color chart outputted from a color output device. However, measuring several hundreds of colors requires a considerable time and labor, which requires a lot of time and labor to create a color transformation table for the color output device, as a result.

SUMMARY OF THE INVENTION

In the light of the above problems, a primary object of this invention is to be able to check correctness and an extracting region of the color signal values, thereby extracting and obtaining a large number of color signal values accurately and readily.

A second object of this invention is to be able to check correctness or an extracting region of the color signal values when the color signal values are extracted, thereby readily creating a color transformation table for a color input device with high accuracy in color transformation.

A third object of this invention is to be able to readily create a color transformation table for a color output device within a short time, by omitting a colorimetric process on color patches outputted from the color output device.

To attain the above objects, the color signal value extracting method of this invention is a method for extracting at least one representative color signal value representing each color region from each of a plurality of color regions in a color patch image, which comprises a region deciding step of deciding a color signal value extracting region for each color region of the color patch image, an extracting step of calculating the representative color signal value of the color region on the basis of color signal values in the color signal value extracting region, a displaying step of making a display unit display the color signal value extracting region along with the color chart image, and a determining step of determining correctness of the representative color signal value on the basis of the color signal value extracting region and the color chart image which are displayed on the display unit.

In the above structure, the operator refers to the color signal value extracting region and the color chart image displayed on the display unit to immediately visually determine whether the color signal values are extracted from a desirable region (region in the vicinity of the center) in the color chart image. Namely, the operator can certainly check correctness of the extracted representative color signal value.

The color signal value extracting method of this invention further comprises a characteristic value calculating step of calculating at least one characteristic value for determining correctness of the representative color signal value on the basis of color signal values in the color signal value extracting region, and a determining step of determining correctness of the representative color signal value on the basis of the characteristic value, along with a region deciding step and an extracting step similar to those described above.

In the above structure, it is possible to immediately quantitatively determine whether color signal values are extracted from a desirable region (region in the vicinity of the center) in the color chart image on the basis of the characteristic value calculated from the color signal values in the color signal value extracting region. Namely, it is possible to certainly check correctness of the extracted representative color signal value.

The color signal value extracting method of this invention further comprises a determining step of determining correctness of the representative color signal value on the basis of the color signal value extracting region and the color chart image which are displayed on the display unit, and the characteristic value, along with a region deciding step, an extracting step, a characteristic value calculating step and a displaying step similar to those described above.

In the above structure, the operator refers to the color signal value extracting region and the color chart image displayed on the display unit to immediately visually determine whether color signal values are extracted from a desirable region (region in the vicinity of the center) in the color chart image, and to immediately quantitatively determine whether color signal values are extracted from a desirable region (region in the vicinity of the center) in the color chart image on the basis of the characteristic value calculated from the color signal values in the color signal value extracting region. Namely, the operator can certainly check correctness of the extracted representative color signal value.

A color signal value extracting apparatus and a record medium, in which a color signal value extracting program is recorded, according to this invention are used to accomplish the above color signal value extracting method.

According to the color signal value extracting method and apparatus, and the record medium in which a color signal extracting program is recorded of this invention, it is possible to certainly check correctness of the extracted representative color signal value, accurately and readily extract and obtain a large number of color signal values, readily create a color transformation table for a color input/output device with high transformation accuracy, and highly accurately (with high evaluation accuracy) check characteristics, particularly, gradation maintainability of a color input/output device.

By displaying the color signal value extracting region on the display unit, the operator can immediately recognize, visually, such a state of the color signal value extracting region that the color signal value extracting region gets close to or extends over a neighboring region, thereby certainly avoiding conditions in which accuracy of the color signal values is largely decreased.

The operator designates coordinates at a coordinate designating step to determine a color signal value extracting region on the basis of the coordinates, so that the color region is grasped certainly and readily.

Alternatively, the operator designates plural points on an outline of one color region at the coordinate designating step, thereby grasping the inside of a polygon formed by connecting the plural points as a color region, readily and certainly.

Plural points are designated on an outline of a region including two or more color regions at the coordinate designating step, the inside of a polygon formed by connecting the plural points can be thereby grasped at a time as two or more color regions. If relative positions of the color regions are know at this time, it is possible to grasp positions of all the color regions in the above region only by designating a few points in the color chart image, which decreases the number of times the coordinates are designated. Particularly, if the above two or more color regions are arranged in a matrix of m rows×n columns (where m and n are natural numbers), it is possible to grasp m×n color regions arranged in a matrix at a time by designating the number of rows m and the number of rows n at the coordinate designating step, whereby representative color signal values are extracted from a number of color regions at a time.

Since a region in the vicinity of the center of each color region is determined as the color signal value extracting region, representative color signals are extracted from a region in the vicinity of the center not optically affected by a neighboring color region in a different color in a color region in the color chart image, which allows large improvement of reliability of the representative color signal values. Since a region in the vicinity of the center of a color region is determined as the color signal value extracting region, it is possible to accurately extract the representative color signals, allowing a slight inclination of a color chart, even if a position of the color chart to the input face of a color input device is not strictly set when the color chart is read by the color input device. Therefore, it is possible to create a color transformation table with a high transformation accuracy, and increase evaluation accuracy of characteristics, particularly, gradation maintainability of a color input/output device.

Even when patches in the same color are read, color signal values outputted from the color input device differ from pixel to pixel due to an effect by characteristics of the device. According to this invention, a first statistical value (for example, an average value) of color signals in the color signal value extracting region is calculated as the representative color signal value. This largely improve reliability or accuracy of the color signal values, which in turn allows creation of a color transformation table with a higher transformation accuracy and higher evaluation accuracy of characteristics, particularly, gradation maintainability of the color input/output device.

A second statistical value (a standard deviation value or a dispersion value) of color signal values in the color signal value extracting region is calculated as the characteristic value, and compared with a threshold value, whereby correctness of the representative color signal is automatically determined, not by visual observation by the operator. For instance, when a standard deviation value (characteristic value) of a color signal value group exceeds a certain threshold value, it is determined that there is a high possibility that an error has occurred when a color chart image has been read, or the color chart originally has any defect. Or it can be determined that there is a high possibility that color signal values of a different color have been calculated, or the color signal values have been effected by another region in a different color, or an inaccurate representative color signal value has been calculated the set color signal value extracting region extends over another region. In such case, by again obtaining the color chart image, it is possible to create a color transformation table with a high transformation accuracy, and improve evaluation accuracy of characteristics, particularly, gradation maintainability of the color input/output device.

According to a color transformation table creating method and apparatus, and a record medium in which a color transformation table creating program is recorded of this invention, when a representative color signal value is extracted in order to create a color transformation table for a color input device is created, the operator refers to a color signal value extracting region and a color chart image displayed on the display unit to immediately visually determine whether color signal values are extracted from a desirable region (region in the vicinity of the center of a color region) in a color region in the color chart image. The operator can also immediately quantitatively determine whether color signal values are extracted from a desirable region (region in the vicinity of the center of a color region) in a color region in the color chart image on the basis of a characteristic value calculated from the color signal values in the color signal value extracting region. It is therefore possible to certainly check correctness of the extracted representative color signal value, and extract and obtain a large number of color signal values accurately and readily. This allows a color transformation table for a color input device with a high transformation accuracy to be created.

Since a large amount of relationship is required in order to create a color transformation table, there is a possibility that the operator mistakes the order in which colorimetrics values obtained by a colorimeter should be correlated with extracted representative color signal values, respectively. According to this invention, the order in which the representative color signal values have been extracted is notified to the operator to clearly show the order in which the color signal values have been obtained, so that the colorimetric values and the representative color signal values are accurately correlated, respectively. This allows a color transformation table for a color input device to be created readily.

According to a color transformation table creating method and apparatus, and a record medium in which a color transformation table creating program is recorded of this invention, a value corresponding to colorimetric value of a color chart is extracted as representative color signal value of each color region at a color chart reading step, a color transforming step and a color signal value extracting step. It is therefore possible to omit a process of actually measuring colors in the color chart outputted from a color output device, and thus create a color transformation table for the color output device within a short time and with ease.

Since transformed color signal values (values corresponding to colorimetric values) are generally integral values equal to or larger than zero in relation with a format of the image, the color signal values cannot be used as data as they are. According to this invention, the color signal values are automatically transformed into values (integral values including negative values, or real number values) corresponding to actual colorimetric values, so that a color transformation table that can be immediately used in the actual color transforming process can be created within a short time.

The operator refers to a color signal value extracting region and a color chart image displayed on the display unit when extracting color signal values, thereby immediately visually determining whether the color signal values are extracted from a desirable region in a color region in the color chart image. The operator can also immediately quantitatively determine whether the color signal values are extracted from a desirable region in a color region in the color chart image on the basis of a characteristic value calculated from the color signal values in the color signal value extracting region. It is therefore possible to certainly check correctness of a extracted representative color signal value, and extract and obtain a large number of color signal values accurately and readily. This allows easy creation of a color transformation table for a color output device with high color transformation accuracy.

According to a gradation maintainability checking method and apparatus, and a record medium in which a gradation maintainability checking program is recorded of this invention, the operator refers to a color signal value extracting region and a color chart image displayed on the display unit when checking gradation maintainability of a color input device, thereby immediately visually determining whether color signal values are extracted from a desirable region in a color region in the color chart image. The operator can also immediately quantitatively determine whether color signal values are extracted from a desirable region in a color region in the color chart image on the basis of a characteristic value calculated from the color signal values in the color signal value extracting region. Therefore, it is possible to certainly check correctness of an extracted representative color signal value, and extract and obtain color signal values accurately and readily. This allows gradation maintainability that is characteristics of a color input/output device to be checked highly accurately (with high evaluation accuracy).

At this time, whether or not all pixels maintain gradations cannot be determined only by looking average values of color signal values obtained from a color signal region in each gradation level. According to this invention, a histogram of color signal values is extracted when a representative color signal value is extracted from a color region in each gradation level to confirm whether all pixels in each gradation level maintain the gradation. It is also possible to grasp within a short time in which rate inversion of gradation in gradation levels occurs. This allows gradation maintainability to be checked with high accuracy.

BRIEF DESCRIPTION OF THE DRAWINGS

FIG. 9 is a diagram showing an example of display on a display in order to explain the method for specifying coordinates of plural color regions according to the embodiment;

FIG. 19 is a diagram showing an example of a concrete display of an order of extraction in the apparatus for creating a color transformation table for a color input device according to the embodiment;

DESCRIPTION OF THE PREFERRED EMBODIMENTS

Description will be now made of an embodiment of the present invention with reference to the drawings.

[1] Description of a Color Signal Value Extracting Method

Figure 1:
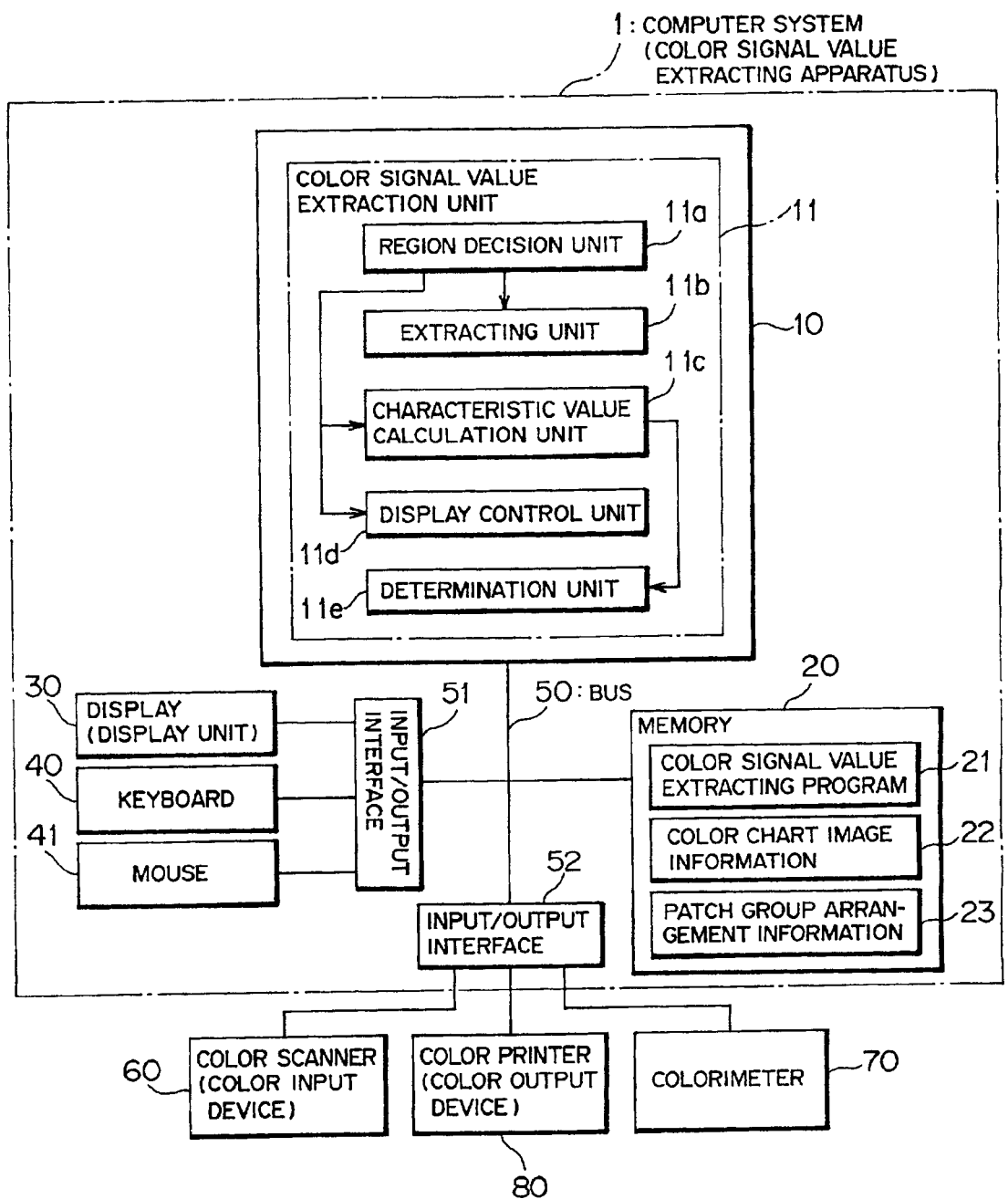
FIG. 1 is a block diagram showing a hardware structure and functional structure of a computer system (color signal value extracting apparatus) accomplishing a color signal value extracting method according to an embodiment of this invention.

FIG. 1 is a block diagram showing a hardware structure and functional structure of a computer system (color signal value extracting apparatus) used to accomplish a color signal extracting method according to an embodiment of the present invention. The computer system (personal computer: PC) 1 shown in FIG. 1 functions as an apparatus for extracting representative color signal values representing each of plural color regions (color patches or gray patches; hereinafter a color region will be occasionally referred to as a patch) in a color chart image.

As shown in FIG. 1, the computer system 1 comprises a CPU 10, and a bus line 50 connected to the CPU 10. A memory (ROM, RAM) 20 is connected to the bus line 50. A display (display unit: for example, CRT, LCD, PDP or the like) 30, a keyboard 40 and a mouse 41 are also connected to the bus line 50 through an input/output interface 51.

A state of display of the display 30 is controlled by the CPU 10 to display various information about extraction of color signal values. Each of the keyboard 40 and the mouse 41 is operated by an operator (user) who refers to a screen of the display 30 to input various directions and information to the CPU 10 (computer system 1).

In the memory 20, there is stored an application program (color signal extracting program) 21 to realize a color signal value extraction unit 11 comprising a region determination unit 11a, an extraction unit 11b, a characteristic value calculation unit 11c, a display control unit 11d and a determination unit 11e. The CPU 10 reads out the application program 21 from the memory 20 via the bus line 50 and execute it, thereby attaining functions as the region determination unit 11a, the extraction unit 11b, the characteristic value calculation unit 11c, the display control unit 11d and the determination unit 11e, that is, a function as the color signal value extracting apparatus. As a result, the color signal value extracting method according to the present invention is executed.

The above application program 21 is provided in a form of a computer readable record medium such as a flexible disk, a CD-ROM or the like in which the application program 21 is computer-readably recorded. The computer system 1 reads the program 21 from the record medium, transfers it to an internal storage unit or an external storage unit and stores it to use the same. It is alternatively possible to record the program 21 in a storage unit (record medium) such as a magnetic disk, an optical disk, a magneto-optic disk or the like, and provide the program 21 to the computer system 1 from the storage unit through a communication path.

When the functions as the region determination unit 11a, the extraction unit 11b, the characteristic value calculation unit 11c, the display control unit 11d and the determination unit 11e are realized, the program 21 stored in the internal storage unit (the memory 20 in this embodiment) is executed by a microprocessor (the CPU 10 in this embodiment) of the computer. At this time, it is alternatively possible that the computer system 1 directly reads the program 21 stored in the record medium to execute it.

In this embodiment, a computer is a concept including hardware and an operation system, signifying hardware operating under a control of the operation system. When the application program alone operates the hardware, not requiring an operation system, the hardware itself corresponds to the computer. The hardware comprises, at least, a microprocessor such as a CPU, and a means for reading the computer program recorded in a record medium.

The application program 21 includes program codes in such the computer (computer system 1) to attain the functions as the region determination unit 11a, the extraction unit 11b, the characteristic value calculation unit 11c, the display control unit 11d and the determination unit 11e. A part of the functions can be realized by an operation system, not the application program 21.

As the record medium in this embodiment, there may be used any one of computer readable various media such as an IC card, an ROM cartridge, a magnetic tape, a punched card, an internal storage unit (a memory such as an RAM, an ROM or the like) of the computer, an external storage unit, a printed matter on which codes such as bar codes or the like are printed, other than the flexible disk, the CD-ROM, the DVD, the magnetic disk, the optical disk, and the magneto-optic disk described above.

In the computer system 1 shown in FIG. 1, a color scanner (color input device) 60, a colorimeter 70 and a color printer (color output device) 80 are connected to the bus line 50 through the input/output interface 52. The computer system 1 does not always require the color scanner 60, the colorimeter 70 and the color printer 80 to attain the function as a color signal value extracting apparatus.

The color scanner 60 can be used to read a color chart (for example, the input color target shown in FIG. 29 or the like) that is an object of color signal extraction to capture color chart image information 22 the color chart into the computer system 1. Alternatively, the color signal value extracting apparatus according to the present invention may capture the color chart image information 22 from another computer, a database or the like over a communication line, or from a record medium such as a flexible disk, a CD-ROM, a DVD, a magnetic disk, an optical disk, a magneto-optic disk, a magnetic tape or the like, without using the color scanner 60.

The color scanner 60 can be a color input device that is an object of color transformation table creation, or a color input device that is an object of gradation maintainability checking, as will be described later. The colorimeter 70 is used to measure each color region in a color chart when a color transformation table for the color input device is created, as will be described later. The color printer 80 outputs a color printed matter responsive to a direction (RGB value signals) from the computer system 1, which can be a color output device that is an object of color transformation table creation, as will be described later.

The memory 20 stores a patch group arrangement information 23, along with the application program (color signal value extracting program) 21 and the color chart image information 22 described above. The patch group arrangement information 23 is information about positional relationships obtained beforehand when the positional relationships among a plurality of color regions in a color chart that is an object of color signal extraction are known, as will be described later with reference to FIGS. 7 and 8.

Next, description will be made of various functions (functions as the region determination unit 11a, the extraction unit 11b, the characteristic value calculation unit 11c, the display control unit 11d and the determination unit 11e) accomplished by the CPU 10.

The region determination unit 11a determines a color signal value extracting region in each color region in a color chart image, as will be described later with reference to FIGS. 10, 13 and 14.

According to this embodiment, coordinates of a color chart image are designated before the region determination unit 11a determines a color signal value extracting region, as will be described later with reference to FIG. 2. The designation of coordinates is done by operating the keyboard 40 or the mouse 41 by the operator referring to a color chart image displayed on the display 30. As a way of designating the coordinates, any one of various ways that will be described later with reference to FIGS. 3 through 5, and 7 through 9 is employed.

The region determination unit 11a specifies the center of each color region on the basis of the designated coordinates (designation information) as will be described later with reference to FIGS. 6 through 8 and 14, and determines a region in the vicinity of the center including the center as the color signal value extracting region as will be described later with reference to FIGS. 10 and 14. A practical example of the center of a color region is a point C0 in FIGS. 7 and 8, or a point 117 in FIG. 14. A practical example of the color signal value extracting region is a rectangular region E described by a dotted-line in FIGS. 10 and 11, or a rectangular region 120 described by a dotted-line in FIG. 14.

The extraction unit 11b calculates representative color signal values of each color region on the basis of color signal values (RGB values, L*a*b* values or the like) in the color signal value extracting region determined by the region determination unit 11a, and extracts the representative color signal values. In concrete, the extraction unit 11b calculates the representative color signal values as first statistical values (for example, average values) of color signal values in the color signal value extracting region.

Similarly, the characteristic value calculation unit 11c calculates characteristic values to determine correctness (accuracy) of the representative color signal values extracted by the extraction unit 11b on the basis of the color signal values (RGB values, L*a*b* values or the like) in the color signal value extracting region determined by the region determination unit 11a. In concrete, the characteristic value calculation unit 11c calculates characteristic values as second statistical values (for example, standard deviation values or dispersion values) of the color signal values in the color signal value extracting region.

The display control unit 11d controls a state of display on the display 30 to make the display 30 display various information about extraction of color signal values. Particularly, the display control unit 11d fulfils a function of making the display 30 display a color chart image on the basis of the color chart image information 22 beforehand stored in the memory 20, and a function of making the display 30 display the color signal value extracting region determined by the region determination unit 11a along with the color chart image, according to this embodiment.

The determination unit 11e determines correctness (accuracy) of the representative color signal values extracted by the extraction unit 11b on the basis of the characteristic values calculated by the characteristic value calculation unit 11c. The determination unit 11e compares the characteristic values (standard deviation values or dispersion values) with predetermined threshold values, respectively, thereby determining correctness of the representative color signal values. In concrete, when the standard deviation values are equal to or larger than the respective threshold values, the determination unit 11e determines that variation in color signal values in the color signal value extracting region determined by the region determination unit 11a is great, thus correctness (accuracy) of the representative color signal values is low, and directs the operator to again obtain the color chart image through the display 30 or the like, as will be described later with reference to FIG. 2.

According to this embodiment, the operator visually examines the color signal value extracting region and the color chart image displayed on the display 30 to recognize whether the color signal value extracting region determined by the region determination unit 11a is appropriate or not (for example, whether color signal extracting region locates in the vicinity of the center of the color region or not), and operates the keyboard 40 or the mouse 41 to input a result of the recognition (OK/NG).

The determination unit 11e according to this embodiment further has a function of determining whether an appropriate color signal region can be determined or not, that is, whether appropriate color signal values can be extracted or not, by again designating coordinates of the present color chart image, when it is visually recognized by the operator that the color signal value extracting region is not appropriate (NG) When determining that appropriate color signal values can be extracted, the determination unit 11e directs the operator through the display 30 or the like to again designate coordinates of the color chart image. When determining that appropriate color signal values cannot be extracted, the determination unit 11e directs the operator through the display 30 or the like to again obtain the color chart image.

Next, procedures for the color signal extracting method (operation of the color signal value extracting apparatus 1 in the above structure) according to this embodiment of the present invention will be described with reference to a flowchart (steps S10 to S20) shown in FIG. 2.

The display control unit 11d reads out the color chart image information 22 beforehand stored in the memory 20 from the memory 20. The color chart image that is an object of color signal value extraction is displayed on the display 30 on the basis of the color chart image information 22 (step S10).

When the operator referring to the color chart image displayed on the display 30 as above designates coordinates of the color chart image by operating the keyboard 40 or mouse 41 (step S11; coordinates designating step), the region determination unit 11a specifies the center of each color region on the basis of the coordinates (designation information) designated at step S11, and determines a region in the vicinity of the center including the center as the color signal value extracting region (step S12; region determining step).

Now, a way of specifying coordinates at step S11, and a way of specifying the center and a way of determining a color signal value extracting region at step S12 will be described with reference to FIGS. 3 through 10.

Figure 3:
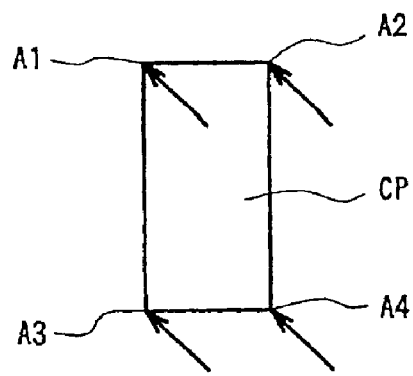
FIGS. 3 through 5 are diagrams for illustrating a method of designating coordinates of a color region according to the embodiment.
Figure 4:
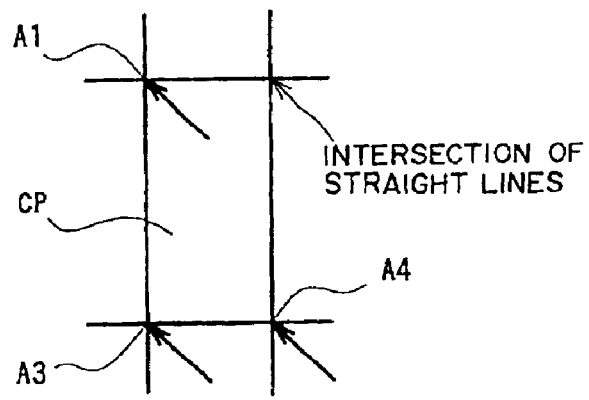
Figure 5:
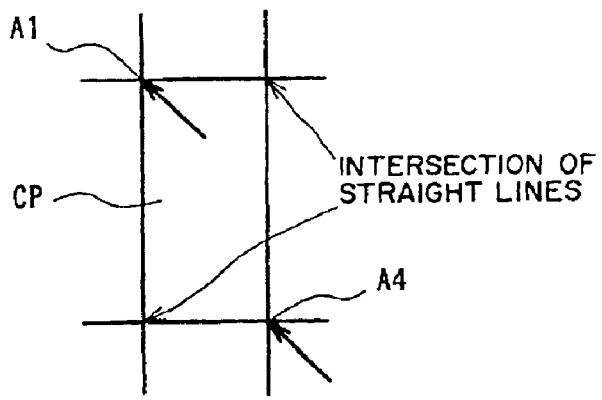
Figure 6:
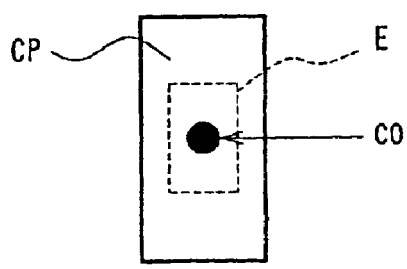
FIG. 6 is a diagram for illustrating a method for specifying the center of a color region and a method for deciding a color signal values extracting region according to the embodiment.
Figure 7:
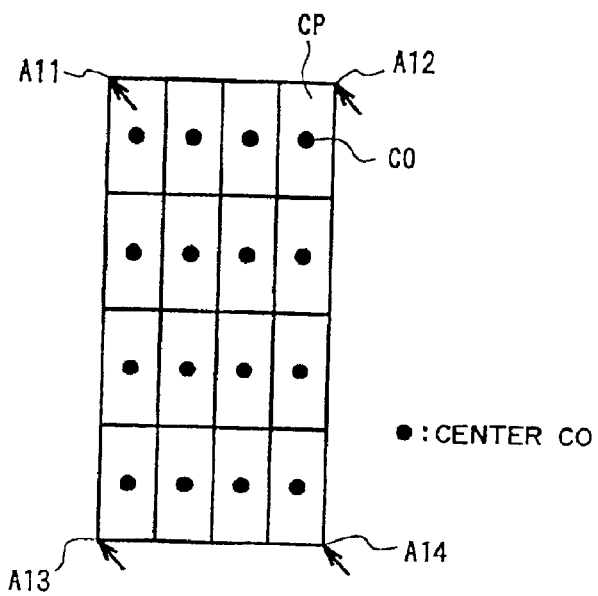
FIGS. 7 and 8 are diagrams for illustrating a method for designating coordinates of a plurality of color regions and a method for specifying the center of each color region.
Figure 8:
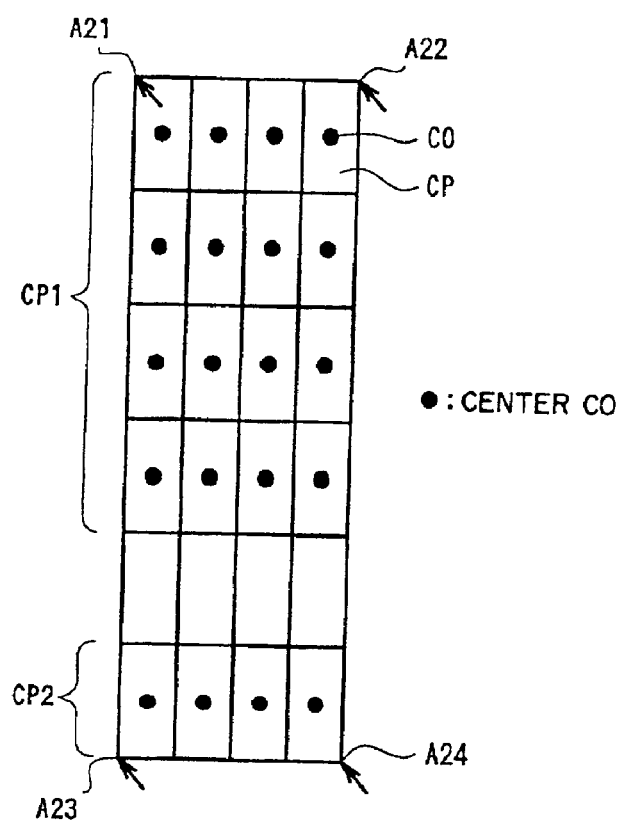

FIGS. 3 through 5 are diagrams for illustrating a way of designating coordinates of one color region (arbitrary one patch) CP according to this embodiment. FIG. 6 is a diagram for illustrating a way of specifying the center C0 of a color region (one patch) CP, and a way of determining a color signal value extracting region E according to this embodiment. FIGS. 7 and 8 are diagrams for illustrating a way of designating coordinates of a plurality of color regions, and a way of specifying the center C0 of each color region CP according to this embodiment. FIG. 9 is a diagram showing an example of practical display on the display 30 in order to explain a way of designating coordinates of a plurality of color regions according to this embodiment. FIG. 10 is a diagram for illustrating the way of determining the color signal value extracting region E according to this embodiment.

In order to extract color signal values of a certain color region (arbitrary one patch) in a color chart image, it is necessary to grasp a position (coordinates) of the color region. If a plurality of points on an outline of the color region are designated, it is possible to recognize the inside of a polygon formed by connecting the designated points so as to grasp it as a color region.

For example, when a certain color region CP in a color chart image is a rectangle as shown in FIG. 3, the region determination unit 11a can recognize and grasp the color region only by designating four vertexes A1 to A4 at step S11.

When a certain color region CP in the color chart image is a rectangle that is completely erected and undistorted, the operator designates three vertexes A1, A3 and A4 at step S11 as shown in FIG. 4. The region determination unit 11a draws four straight lines in the horizontal and vertical directions on the basis of the three designated vertexes A1, A3 and A4 so as to recognize and grasp the inside of the rectangle formed by these four straight lines as the color region CP. When the color region PC is completely erected and undistorted as above, the operator designates only two vertexes A1 and A4 that are opposite angles to each other as shown in FIG. 5, the region determination unit 11a can thereby recognize and grasp the color region CP.

The region determination unit 11a can recognize and grasp the color region CP on the basis of the vertexes of a certain color region CP designated as shown in FIGS. 3 through 5, thereby specifying and grasp the center CP of the color region CP as shown in FIG. 6. When the color region CP is a rectangle, the center C0 of the color region CP is specified as an intersection of diagonals or a center of gravity of the rectangle. Incidentally, when the color region is not a rectangle, it is possible to specify the center of the rectangle as a center of gravity of the recognized, grasped color region, for example.

After that, the region determination unit 11a determines a region in the vicinity of the center of the color region CP including the center C0 as the color signal value extracting region E, as shown in FIG. 6. In the example shown in FIG. 6, the color signal value extracting region E is a rectangular region smaller than the color region CP in which the center C0 is the center (center of gravity), which is determined as a rectangular region almost similar to a rectangle forming the color region CP.

When color signal values of a number of color regions CP distributed in the color chart image are extracted, a lot of time is required to designate the coordinates of color regions one by one in the way shown in FIGS. 3 to 5. If positional relationships (state of arrangement) of a plurality of color regions in a color chart that is an object of color signal value extraction, that is, relative coordinate values of the color regions, are known, and the relative coordinate values are beforehand stored as the patch group arrangement information 23 in the memory 20, it is possible to recognize and grasp at a time all the color regions on the basis of designated points and the patch group arrangement information 23 by only designating a few number of points in the color chart image, not by designating coordinates of each of the color regions one by one. Whereby, it is possible to largely decrease the number of times the coordinates are designated.

In the case where a plurality of color regions CP forming a color chart image are arranged in a 4×4 matrix, each of which is the same rectangle as shown in FIG. 7, for example, if the operator designates only four vertexes A11, A12, A13 and A14 of a rectangle that is an outline of a color chart image, the region determination unit 11a can recognize and grasp at a time 16 color regions CP inside the outline.

A color chart image shown in FIG. 8 includes two patch groups CP1 and CP2. In this color chart image, color regions having the same rectangular shape are arranged in a 6×4 matrix. However, color regions in the fifth row from the top are handled as not exist. Namely, the patch group CP1 is formed with color regions CP having the same rectangular shape arranged in a 4×4 matrix, like the color chart image shown in FIG. 7. However, the patch group PC2 is formed with color regions CP (color regions CP having the same rectangular shape arranged in a 1×4 matrix), which are separated by one row from the patch group CP1.

If a state of arrangement as shown in FIG. 8 is known, the region determination unit 11a can recognize and grasp at a time 20 color regions CP inside an outline when the operator designates only four vertexes A21, A22, A23 and A24 of a rectangle which is described by the outline of the color chart image.

In the example shown in FIGS. 7 and 8, if an outline of a plurality of color regions forms a shape completely erected and undistorted, similarly to the example shown in FIGS. 4 and 5, the region determination unit 11a can recognize and grasp all color regions PC inside the outline when the operation designates three or two vertexes at step S11.

The region determination unit 11a can recognize and grasp all the color regions CP on the basis of the vertexes A11 to A14 or A21 to A24 of the color chart image designated as shown in FIG. 7 or 8, thereby to specify the centers C0 of the color regions CP as shown in FIG. 7 or 8. Since each color region CP is rectangular, the center C0 of each color region CP is specified as an intersection of diagonals of the rectangle, or a center of gravity of the same.

In the case where relative coordinate values of color regions are not known and the relative coordinate values are not beforehand stored as the patch group arrangement information 23 in the memory 20, coordinate designation is performed as shown in FIG. 9 at step S11 when m×n color regions CP are arranged in a matrix of m rows by n columns (where m and n are natural numbers) inside an outline (region) having a rectangular shape and the number of rows m and the number of columns n are known.

Namely, four vertexes CO1, CO2, CO3 and CO4 of an outline having a rectangular shape are designated, and the number of rows m and the number of columns n are inputted using the keyboard 40 through a window displayed on the color chart image on the display 30. The region determination unit 11a can thereby recognize and grasp at a time m×n color regions CP inside the outline on the basis of the number of rows m and the number of columns n, and coordinates of the vertexes CO1 to CO4.

Figure 29:
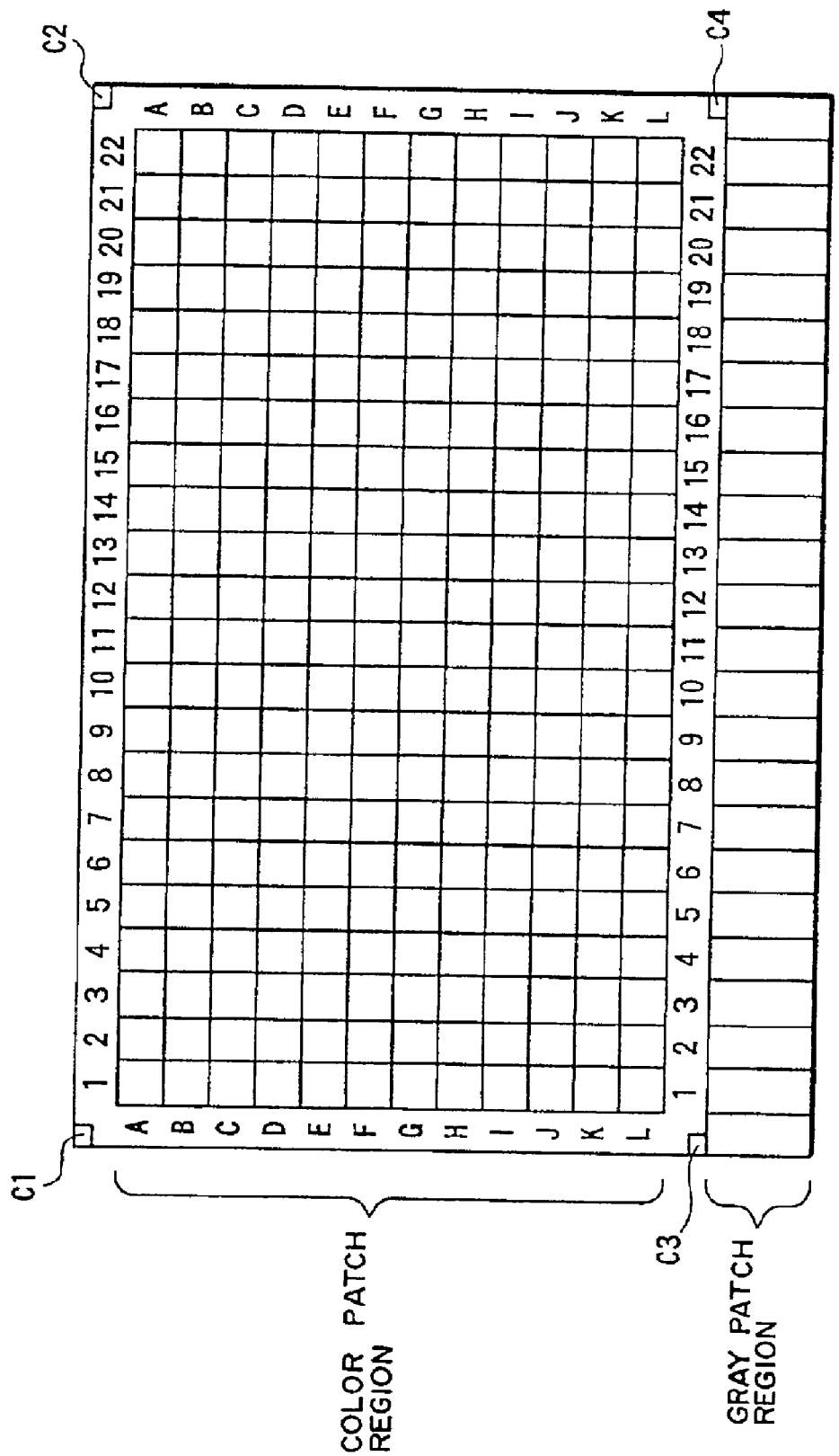
FIG. 29 is a diagram showing an example of a known color chart (input color target).

Incidentally, the color chart image shown in FIG. 9 corresponds to the input color target shown in FIG. 29. In the example shown in FIG. 9, "22" is inputted to be set as "the number in the X direction", that is, the number of columns n, and "12" is inputted to be set as "the number in the Y direction", that is, the number of rows m in a patch number input window displayed on the color image.

In the example shown in FIG. 9, "0.5" is inputted to be set as both "a rate of obtaining in the Y direction" and "a rate of obtaining in the X direction", along with "the number in the X direction" and "the number in the Y direction". The rate of obtaining relates to a size of the color signal value extracting region E to be extracted from the color region CP. When 0.5 is set to the rate of obtaining, a length of each side of the rectangle forming the color signal value extracting region E is a half of a length of each side of a rectangle forming the color region CP.

Figure 10:
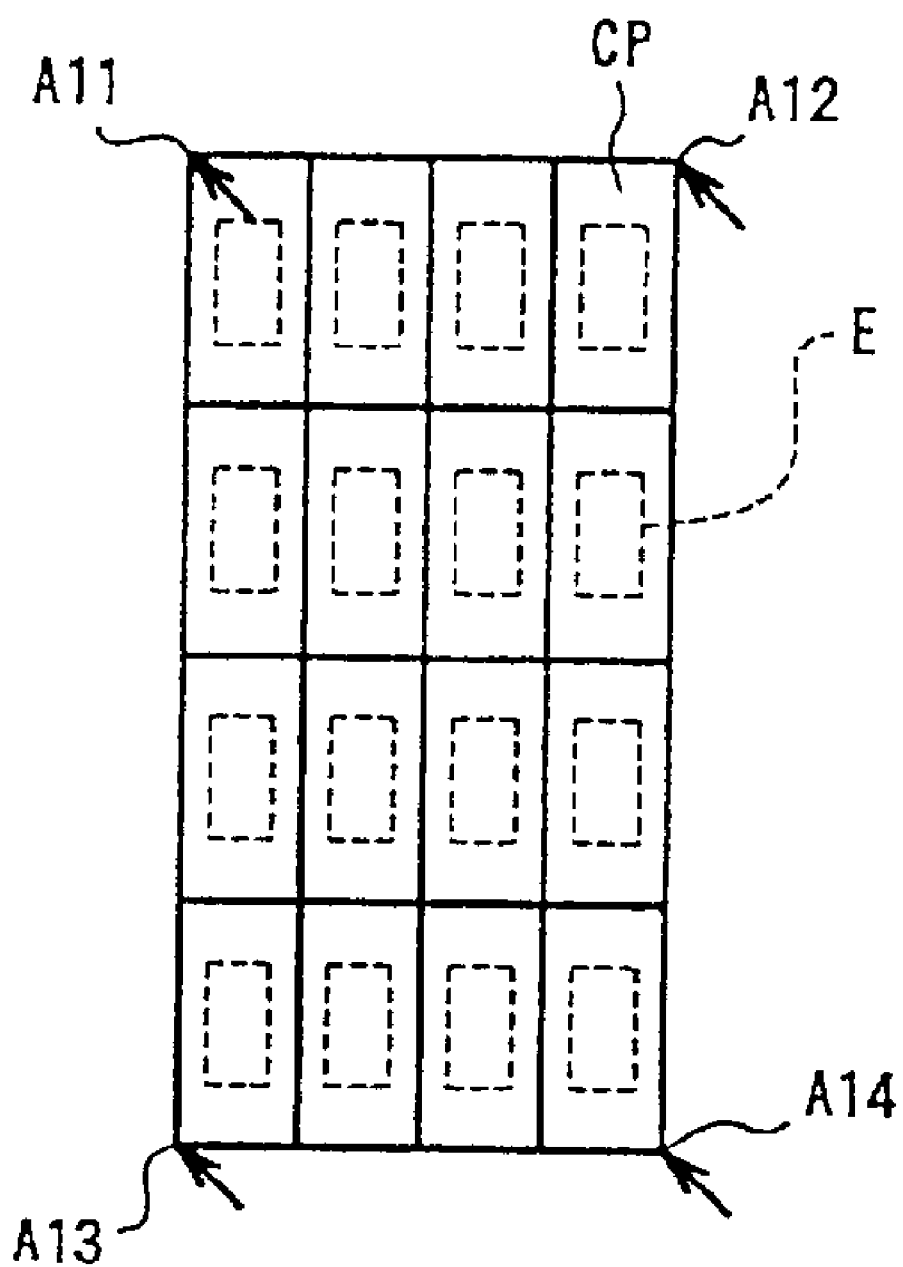
FIG. 10 is a diagram for illustrating the method for deciding a color signal value extracting region according to the embodiment.

After that, the region determination unit 11a determines a region in the vicinity of the center including the center C0 in each color region CP as the color signal value extracting region E, as shown in FIG. 10. The example shown in FIG. 10 corresponds to a color chart image shown in FIG. 7. In the example shown in FIG. 10, each of the color signal value extracting regions E is a rectangular region smaller than a color region CP, with the center C0 being a center (center of gravity). Additionally, the color signal value extracting region E is determined as a rectangular region almost similar to a rectangular region forming the color region CP. When coordinates are designated in the manner shown in FIGS. 8 and 9, the color signal value extracting region E in each of the color regions is determined in the similar manner shown in FIG. 10.

The way of specifying the center and the way of determining the color signal value extracting region at step S12 will be now described in more detail with reference to FIGS. 13 and 14.

Figure 13:
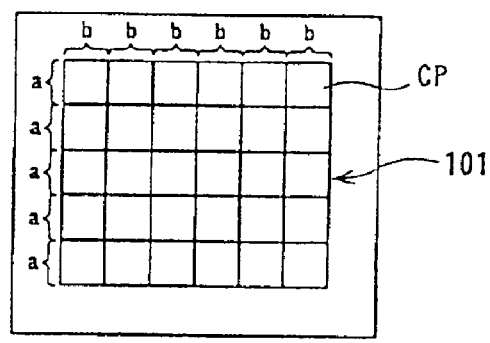
FIG. 13 is a diagram showing an example of concrete arrangement of color patches.

FIG. 13 is a diagram showing an example of practical arrangement of color patches. FIG. 14 is a diagram for concretely illustrating the way of specifying the center of a color region, and the way of determining the color signal value extraction region according to this embodiment.

In a color patch region 101 of a color chart shown in FIG. 13, for example, color regions CP having the same rectangular shape are arranged in a 5×6 matrix, and equally spaced. Each color region CP has a vertical side in length "a" and a horizontal side in length "b". Assuming that such the color path region 101 is displayed as a color chart image on the display 30 as shown in FIG. 14. Also assuming that relative coordinate values of the color regions CP are known, and the relative coordinate values are beforehand stored as the patch group arrangement information 23 in the memory 20.

Figure 14:
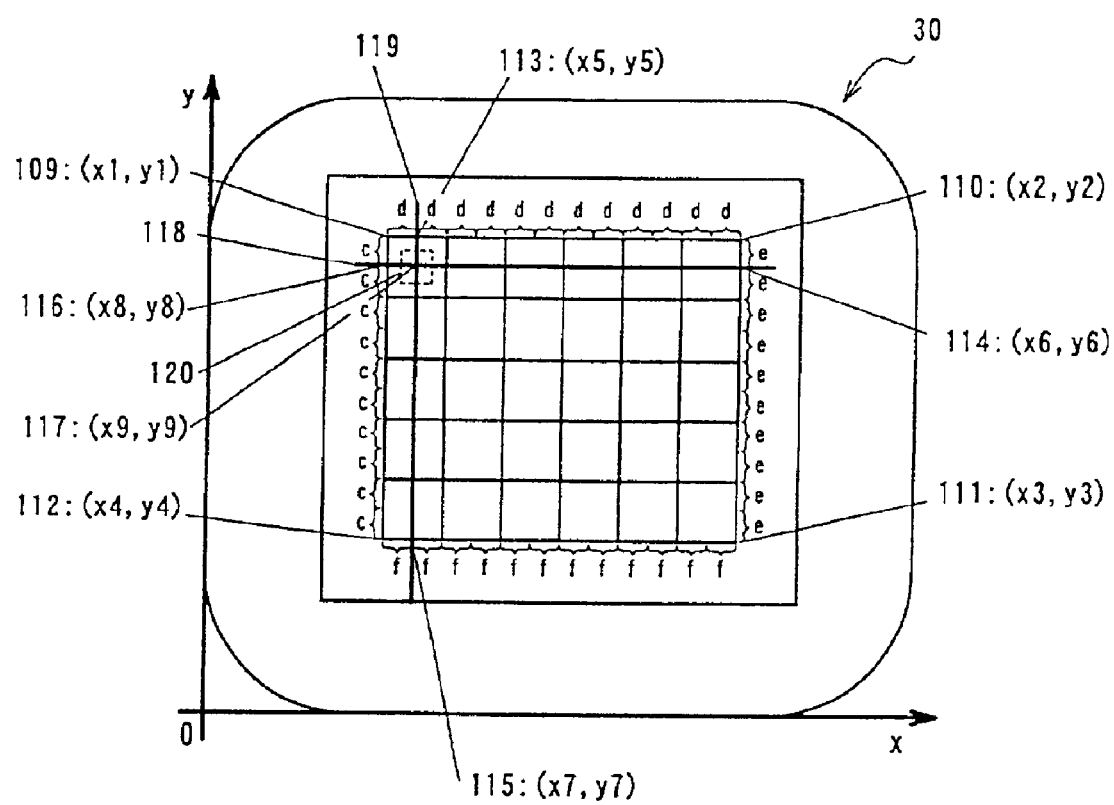
FIG. 14 is a diagram for concretely illustrating the method for specifying the center of a color region and the method for deciding a color signal value extracting region.

In the color chart image shown in FIG. 14, four vertexes 109, 110, 111 and 112 of the color patch region 101 having a rectangular outline are designated using the mouse 41 or the like at step S11. Responsive to it, the region determination unit 11a of the CPU 10 obtains image coordinates (x1, y1), (x2, y2), (x3, y3) and (x4, y4) of the four vertexes 109, 110, 111 and 112.

At step S12, the region determination unit 11a obtains coordinates of the center 117 of each of the color regions CP on the basis of the obtained image coordinates (x1, y1), (x2, y2), (x3, y3) and (x4, y4) and the patch group arrangement information 23 stored beforehand in the memory 20 as in the following manner.

When coordinates of the center 117 of a certain color region CP shown in FIG. 14 are determined, the region determination unit 11a calculates two straight lines 118 and 119 estimated to pass through the center 117. For this, the region determination unit 11a calculates coordinates (x5, y5), (x6, y6), (x7, y7) and (x8, y8) of four points 113, 114, 115 and 116 on the two straight lines 118 and 119 using the following equations (1) to (8):

$$x5 = x1 + ((x2-x1)/ROW\#NUM)*((PATCH\#ROW-1)+0.5) \quad (1)$$

$$y5 = y1 + ((y2-y1)/ROW\#NUM)*((PATCH\#ROW-1)+0.5) \quad (2)$$

$$x6 = x2 + ((x3-x2)/COLUMN\#NUM)*((PATCH\#COLUMN-1)+0.5) \quad (3)$$

$$y6 = y2 + ((y3-y2)/COLUMN\#NUM)*((PATCH\#COLUMN-1)+0.5) \quad (4)$$

$$x7 = x4 + ((x3-x4)/ROW\#NUM)*((PATCH\#ROW-1)+0.5) \quad (5)$$

$$y7 = y4 + ((y3-y4)/ROW\#NUM)*((PATCH\#ROW-1)+0.5) \quad (6)$$

$$x8 = x1 + ((x4-x1)/COLUMN\#NUM)*((PATCH\#COLUMN-1)+0.5) \quad (7)$$

$$y8 = y1 + ((y4-y1)/COLUMN\#NUM)*((PATCH\#COLUMN-1)+0.5) \quad (8)$$

where, ROW#NUM is the number of columns of all patches, COLUMN#NUM is the number of rows of all patches, PATCH#ROW is the order of a patch counted from the left, and PATCH#COLUMN is the order of a patch counted from the top.

On the basis of the coordinates (x5, y5), (x6, y6), (x7, y7) and (x8, y8) of the four points 113, 114, 115 and 116 calculated through the equations (1) to (8), the region determination unit 11a calculates the two straight lines 118 and 119, then calculates coordinates of an intersection of these straight lines as image coordinates (x9, y9) of the center 117. Alternatively, it is possible to first calculate coordinates of four vertexes of the patch CP, then calculate coordinates of a center of gravity of the four vertexes as the coordinates (x9, y9) of the center 117.

The region determination unit 11a determines a region 120 in a rectangular shape having two sides in lengths given by the following equations (9) and (10) with a point 117 whose coordinates are (x9, y9) as the center. The region determination unit 11a extracts and obtains color signal values from the region 120 (color signal value extracting region E) as will be described later:

$$\text{side 1 (horizontal side)} = (d+f)/2 \quad (9)$$

$$\text{side 2 (vertical side)} = (c+e)/2 \quad (10)$$

Figure 2:
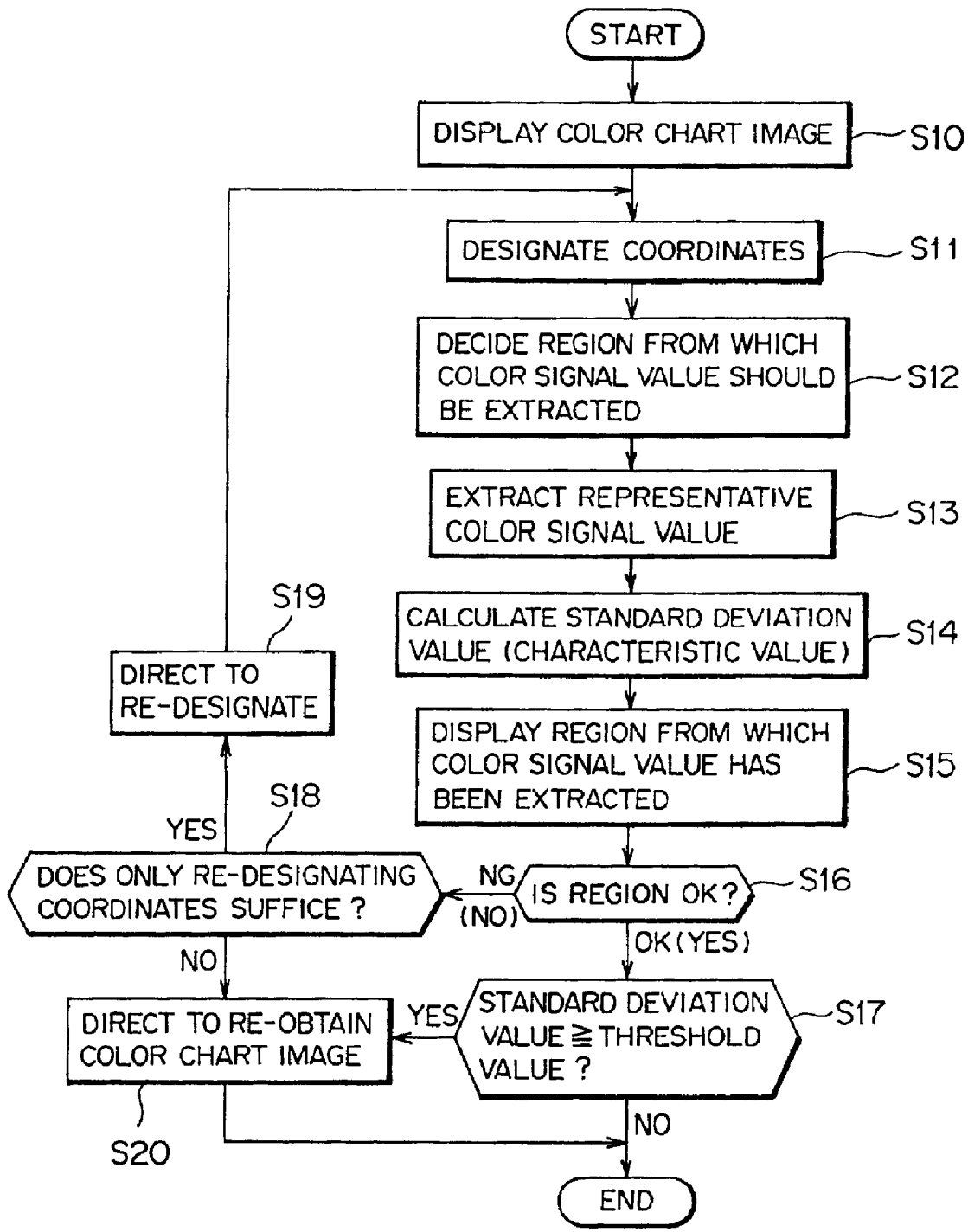
FIG. 2 is a flowchart for illustrating p procedures for the color signal value extracting method according to the embodiment of this invention.

When the color signal value extracting region E is determined at step S12 as above, the extracting unit 11b calculates and extracts representative color signal values of each color region CP as average values of color signal values in the color signal value extracting region E determined at step S12, as shown in FIG. 2 (step S13; extracting step). The characteristic value calculation unit 11c calculates characteristic values to determine correctness (accuracy) of the representative color signal values extracted at step S13 as standard deviation values of color signal values in the color signal value extracting region E determined at step S12 (step S14; characteristic value calculating step).

As color signal values (first statistical values) representing a patch CP, center values or medians in the color signal value extracting region E (region 120) maybe calculated and extracted in place of average values. As characteristic values (second statistical values), dispersion values of color signal values in the color signal value extracting region (region 120) may be calculated in place of standard deviation values.

As stated above, a neighboring part (periphery) of a color region CP is optically affected by other neighboring color regions CP in each of color regions CP in the color chart image, so that reliability of color signal values in the neighboring part is low. Color signal values obtained by a color input device such as a color scanner 60 or the like are greatly different from pixel to pixel since they are affected by characteristics of the device even if the color signal values are read from the same color region CP.

Figure 11:
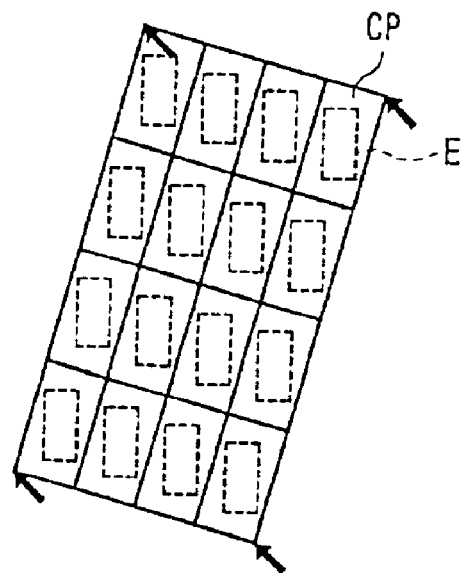
FIG. 11 is a diagram for illustrating effects by the color signal value extracting region decided in the method according to the embodiment.

According to this embodiment, as shown in FIGS. 6, 10 and 14, a region in the vicinity of the center of each color region CP is determined as the color signal value extracting region E (region 120), and representative color signal values are calculated as statistical values such as average values or the like from the region E, which allows to extract highly-reliable color signal values. Since a region E (region 120) in the vicinity of the center is used when color signal values are extracted, slight inclination of the color chart causes no problem to extract and obtain representative color signal values when a color chart is read by a color input device as shown in FIG. 11. FIG. 11 is a diagram for illustrating an effect of the color signal value extracting region E determined in the manner according to this embodiment.

When the representative color signal values are extracted at step S13 and the characteristic values are calculated at step S14, as shown in FIG. 2, the display control unit 11*d* makes the display 30 display the color signal value extracting region E (rectangular region 120) determined at step S12, that is, a part used to obtain the representative signal values or the characteristic values is displayed along with the color chart image on the display 30 (step S15; displaying step).

Figure 12:
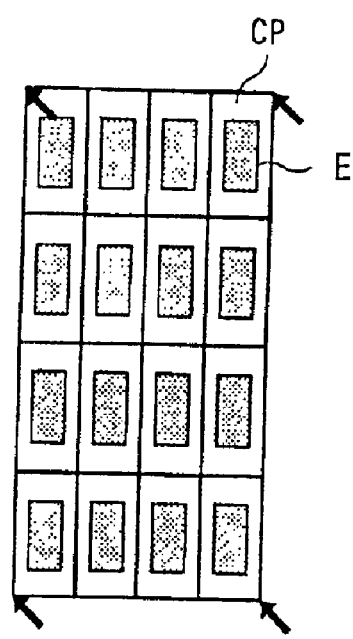
FIG. 12 is a diagram showing an example of display of color signal value extracting regions according to the embodiment.

At this time, the color signal value extracting region E determined at step S13 is highlighted inside each of the color regions CP in the color chart image on the display 30, as shown in FIG. 12, for example. FIG. 12 is a diagram showing an example of display of the color signal value extracting region E on the display 30 according to this embodiment. In FIG. 12, there is shown an example of display of the color patch region CP1 shown in FIGS. 7 and 10.

As a way of highlighting on the display 30, various ways are possible. For example, ① all RGB values in the region E are made (0, 0, 0), ② all RGB values in the region E are made (255, 255, 255), ③ a color of the region E is made reversal to a color of a corresponding patch CP, ④ the region E is enclosed by a black frame to be displayed, or ⑤ the region E is highlighted. By such highlighting, the color signal value extracting region E is notified to the operator (user).

The operator visually observes the color signal value extracting region E and the color chart image displayed on the display 30 to recognize whether the color signal value extracting region E determined at step S12 is appropriate or not, that is, whether the color signal values obtained at step S13 are extracted from an appropriate region (region in the vicinity of the center of the patch CP) in each patch CP or not, and operates the keyboard 40 or the mouse 41 to input a result (OK/NG) of the recognition (step S16; determining step).

When it is visually recognized that the color signal value extracting region E is inappropriate (NG route at step S16), the determination unit 11*e* determines whether an appropriate color signal value extracting region E can be determined or not, that is, whether appropriate color signal values can be extracted, by again designating coordinates of the present color chart image (step S18; determining step).

When it is determined that appropriate color signal values can be extracted by again designating coordinates since the coordinates have been inappropriately designated by the operator, for instance, (YES route at step S18), re-designation is directed to the operator through the display 30 or the like (step S19), and the procedure returns to step S11. Namely, the operator having received the direction at step S19 re-designates coordinates in the color chart image using the keyboard 40 or the mouse 41. In the example shown in FIG. 14, the operator re-designates four vertexes 109 to 112.

When it is determined that appropriate color signal values cannot be extracted only by re-designating coordinates since the color chart image is distorted, for instance (NO route at step S18), re-obtaining of the color chart image (color chart image information 22) is directed to the operator through the display 30 or the like (step S20), and the process is terminated.

When it is visually recognized that the color signal value extracting region E is appropriate (OK route at step S16), the determination unit 11*e* determines correctness (accuracy) of the representative color signal values extracted at step S13 on the basis of the characteristic values calculated at step S14 (step S17; determining step)

At this time, the determination unit 11*e* according to this embodiment determines correctness of the representative color signal values by comparing standard deviation values that are the characteristic values with threshold values set beforehand, respectively. When the standard deviation value is equal to or larger than the threshold value 10.0 as shown in a formula (11) below, for example (YES route at step S17), it is determined that the color signal values in the color signal value extracting region E are uneven, thus correctness (accuracy) of the representative color signal value is low. As a result, re-obtaining of the color chart image (color chart image information 22) is directed to the operator through the display 30 or the like (step S20), and the process is terminated.

$$\text{standard deviation value of color signal value} \geq 10.0 \quad (11)$$

When color signal values in the color signal value extracting region E are uneven, it can be determined that an error has occurred when the color chart has been read by the color scanner 60 in order to obtain the color chart information 22, or that there is a high possibility that a defect has occurred in the color chart from which the color chart image information 22 has been obtained. Or, it can be determined that there is a high possibility that an inappropriate representative color signal value has been calculated since a color signal value of another color has been calculated, or an effect of another color region CP has been exerted, or the color signal value extracting region E stretching over another color region CP has been set.

The operator having received the direction at step S20 re-obtains the color chart image (color chart image information 22) by again reading the color chart by the color scanner 60 or the like. After that, the color signal value extracting process on the re-obtained color chart image is again performed from step S10.

In the procedures for the process shown in FIG. 2, the color signal value extracting region E is displayed after the representative color signal values are extracted. However, the color signal value extracting region E may be displayed on the display 30 immediately after the color signal value extracting region E is determined at step S12, then the operator may visually observe it. Namely, steps S15 and S16 may be executed between steps S12 and S13. In which case, only when it is determined in visual observation by the operator that the color signal value extracting region E is appropriate, representative color signal values are extracted from that color signal value extracting region E and characteristic values are calculated, so that there is no case where calculation of the representative color signal values and the characteristic values become wasteful.

According to the color signal value extracting method and the color signal value extracting apparatus 1 of this embodiment, the operator can immediately visually determine whether color signal values are extracted from a desirable region (region in the vicinity of the center) in a color region CP in the color chart image or not by referring to the color signal value extracting region E and the color chart image displayed on the display 30. The operator can also immediately quantitatively determine whether color signal values are extracted from an appropriate region (region in the vicinity of the center of a color region CP) in the color region CP in the color chart image on the basis of the standard deviation values (characteristic values) calculated from color signal values of the color signal value extracting region E.

Accordingly, it is possible to certainly check correctness of the extracted representative color signal values, to extract and obtain accurately and readily a large number of color signal values, and to readily create a high-accuracy color transformation table for a color input/output device. It is also possible to check at a high accuracy (with high evaluation accuracy) characteristics of the color input/output device, particularly, gradation maintainability.

In evaluating characteristics of the color scanner 60, for example, a color chart is experimentally read to quantitatively evaluate color signal values outputted from the scanner 60. On which occasion, it is essential to grasp a state of arrangement of hundreds of patches (color regions) in the color chart to extract color signal values from each patch in the color chart image according to the state of arrangement. It is impossible to fully automate extraction of color signal values since there are colors in a low lightness region a difference between which only man can discriminate, although extraction of the color signal values is tried to be fully automatically carried out.

However, according to this embodiment, it is possible to readily and certainly grasp each color region CP in the CPU 10 (region determination unit 11a) by designating image coordinates using the mouse 41 or the like by the operator.

For instance, the operator designates a plurality of points on an outline of a certain color region CP at the coordinate designating step S11, whereby the inside of a polygon formed by connecting the plural points can be readily and certainly grasped as a color region.

A plurality of points may be designated on the outline including two or more color regions CP at the coordinate designating step S11 to grasp at a time the inside of a polygon formed by connecting the plural points as two or more color regions CP. In which case, if a relative position of each of the color regions CP is known, it is possible to grasp positions of all the color regions CP within the above region only by designating a small number of points in the color chart image. This can decrease the number of times the coordinates are designated.

When two or more color regions CP are arranged in a matrix of m rows by n columns (where m and n are natural numbers), the number of rows m and the number of columns n are designated at the coordinate designating step S1, the m×n color regions CP can be thereby grasped at a time even if relative positions of the color regions CP are not known. This allows representative color signal values to be extracted at a time from a number of color regions CP.

When the representative color signal values are extracted, appearance of a part used for extraction of the color signal values is changed in the color chart image to highlight the part (color signal value extracting region E, 120). It is thereby possible to recognize whether the extracted representative color signal values are obtained from a sole color region CP or not. This allows extraction of more accurate representative signal values. Namely, by displaying the color signal value extracting region E on the display 30, the operator can visually recognize it when the color signal value extracting region E is in proximity to or extends over the neighboring color region CP. This can certainly prevent a large decrease in accuracy of the color signal values.

According to this embodiment, a region in the vicinity of the center of a rectangle including the center C0 of each color region CP is determined as the color signal value extracting region E or 120, whereby representative color signal values of the color region are extracted from a region not optically affected by a neighboring color region CP in a different color. This leads to large improvement of reliability of the representative color signal values.

Since a region in the vicinity of the center of a color region CP is determined to be the color signal value extracting region E or 120, it is possible to accurately extract representative color signal values while permitting a slight inclination of the color chart even if a position of the color chart to an input face of the color input device is not strictly set when the color chart is read by the color input device (color scanner 60). Therefore, a color transformation table with a higher accuracy of the transformation, and an accuracy of evaluation of the characteristics, particularly, gradation maintainability of the color input device can be more improved.

There is a possibility that even if patches in the same color are read, color signal values of the patches outputted from the color input device (color scanner 60) are quite different from pixel to pixel due to an effect by characteristics of the device. According to this embodiment, average values of the color signal values in the color signal value extracting region E or 120 are outputted as the representative color signal values, whereby the reliability and accuracy of the color signal values are largely improved. This enables creation of a color transformation table with a higher accuracy of the transformation, and improves an accuracy of evaluation on the characteristics, particularly, gradation maintainability of the color input device.

Standard deviation values of the color signal values in the color signal value extracting region E or 120 are calculated as characteristic values, and the characteristic values are compared with threshold values, respectively. It is thereby possible to automatically determine correctness of the representative color signals, without relying on viewing or the like of the operator.

When a standard deviation value (characteristic value) of a color signal value group exceeds a certain threshold value, color signal values in the color signal value extracting region E or 120 are uneven, so that reliability (correctness, accuracy) of a representative color signal value extracted from such the color signal value extracting region E or 120 is determined to be low. In such case, a color chart image is again obtained in order to create a color transformation table with a higher accuracy of the transformation. This also allows improvement of evaluation on characteristics, particularly, gradation maintainability of the color input device.

[2] Description of a Method for Creating a Color Transformation Table for a Color Input Device Next, description will be made of creation of a color transformation table (profile) in which relationship between a color space (RGB values; device-dependent color space) of the color scanner 60 as a color input device and a color space (for example, L*a*b* values; device-independent color space) independent of a device is stored, using the above color signal value extracting method.

A color transformation table generally stores correspondence of about 5000 (to 30000) colors. According to this embodiment, a grid-like color transformation table in the RGB space (RGB space having 17×17×17 grid points) having values in 17 levels of each of RGB colors, as shown in, for example, the following Table 1. Here, a range of the L*a*b* values are classified into $0 \leq L^* \leq 100$, $-128 \leq a^* \leq 127$, and $-128 \leq b^* \leq 127$.

TABLE 1

| RGB values | L* a* b* values |
|---|---|
| (0, 0, 0) | ($L^*_{(0, 0, 0)}$ $a^*_{(0, 0, 0)}$ $b^*_{(0, 0, 0)}$) |
| (0, 0, 15) | ($L^*_{(0, 0, 15)}$ $a^*_{(0, 0, 15)}$ $b^*_{(0, 0, 15)}$) |
| . | . |
| . | . |
| . | . |
| (255, 255, 255) | ($L^*_{(255, 255, 255)}$ $a^*_{(255, 255, 255)}$ $b^*_{(255, 255, 255)}$) |

The grid-like color transformation table in the RGB space shows relationship between colors (grid-like points) distributed in a grid arrangement in the RGB space and corresponding colors in the L*a*b* space, that is, relationship between RGB values obtained by reading a color original by a color scanner and outputted, and L*a*b* colorimetric values of the color original. The color transformation table stores "RGB value data sets in a grid arrangement" in which the RGB values regularly increase as shown in, for example, Table 1.

Figure 18:
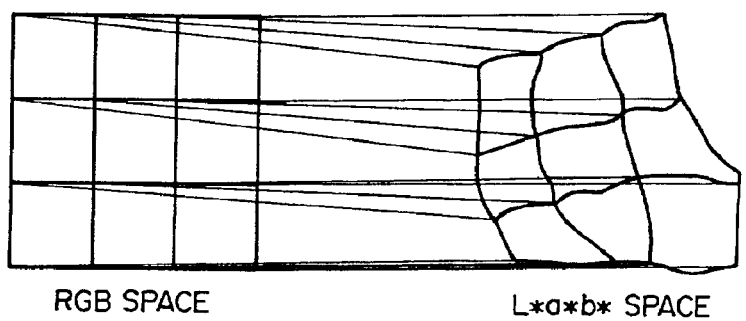
FIG. 18 is a diagram showing relationship between the RGB value space with the L*a*b* color space.

The RGB values distributes in a grid arrangement in the RGB space. However, the RGB space does not have a linear relation with the L*a*b* space. For this, points obtained by transforming the RGB values into the L*a*b* values do not distribute in a grid arrangement, the distribution of which is distorted. FIG. 18 conceptually shows relationship between the RGB value space and the L*a*b* value space in two dimensions.

Figure 15:
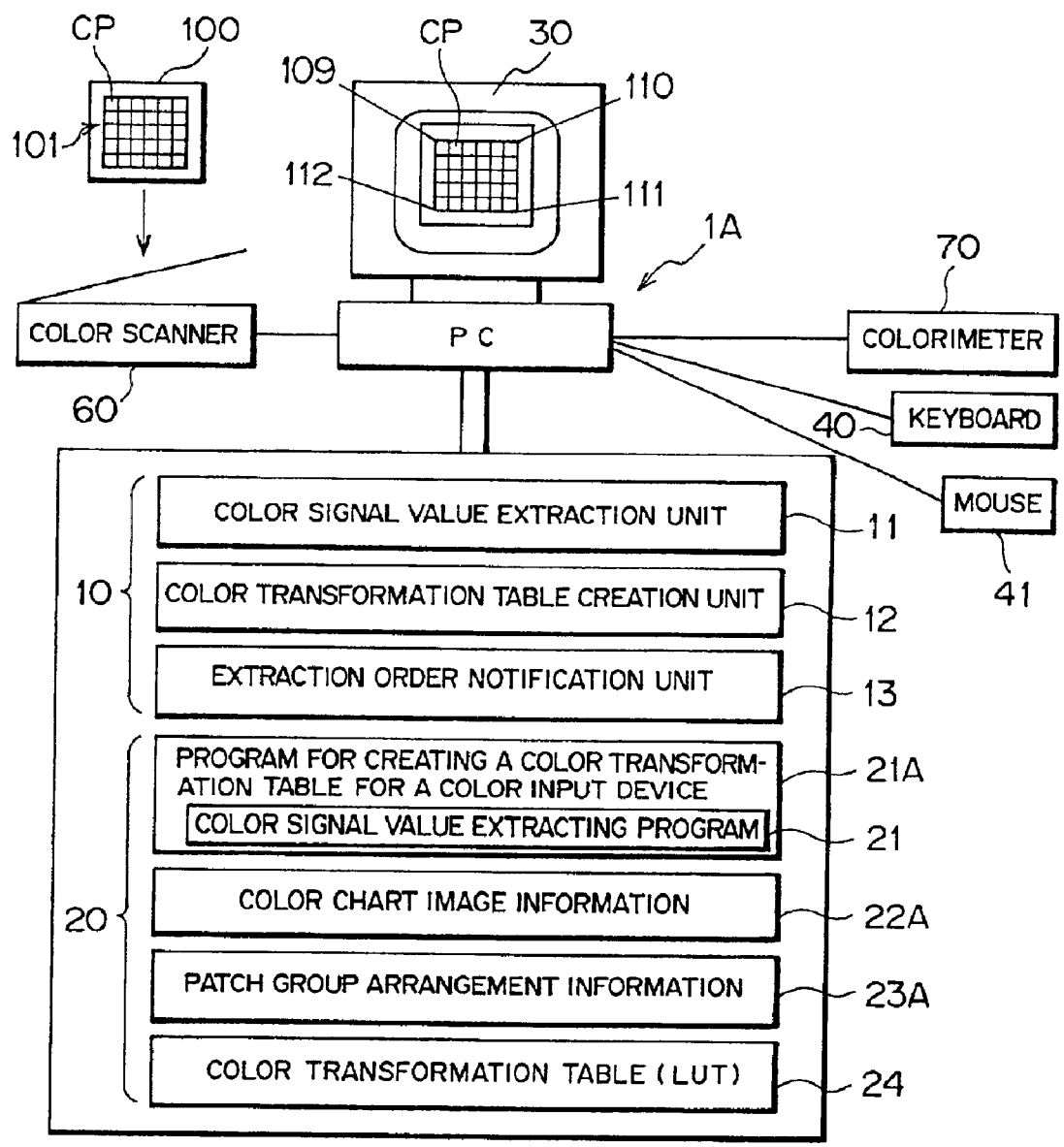
FIG. 15 is a block diagram showing a hardware structure and functional structure of a computer system (apparatus for creating a color transformation table for a color input device) for accomplishing a method for creating a color transformation table for a color input device according to the embodiment of this invention.

FIG. 15 is a block diagram showing a hardware structure and functional structure of a computer system (an apparatus for creating a color transformation table for a color input device) for accomplishing a method for creating a color transformation table for a color input device according to the embodiment of the present invention. The computer system (personal computer: PC) 1A shown in FIG. 15 functions as an apparatus for creating a color transformation table for a color scanner 60 that is a color input device. Incidentally, the same reference characters in FIG. 15 designate like or corresponding parts, detailed descriptions of which are thus omitted.

The computer system 1A shown in FIG. 15 has the similar structure to the computer system 1 shown in FIG. 1. However, FIG. 15 more schematically shows the structure of the computer system 1A.

A memory 20 of the computer system 1A stores an application program (a program for creating a color transformation table for a color input device) 21A used to realize a color signal value extraction unit 11, a color transformation table creation unit 12 and an extraction order notification unit 13.

A CPU 10 reads the application program 21A from the memory 20 through the bus line 50 (refer to FIG. 1) and executes it to attain functions as the color signal value extraction unit 11, the color transformation table creation unit 12 and the extraction order notification unit 13 (details of which will be described later), that is, a function as the apparatus for creating a color transformation table for a color input device, thereby executing the method for creating a color transformation table for a color input device according to this embodiment.

The application program 21A includes the above-described color signal value extraction program 21 in order to attain the function as the color signal value extraction unit 11 by the CPU 10.

The above application program 21A is stored in a computer readable record medium such as a flexible disk, a CD-ROM or the like, and provided, like the above-described program 21. The computer system 1A reads the program 21A from the record medium, transfers and stores it in an internal storage unit or an external storage unit to use the same. It is alternatively possible to record the program 21A in a storage unit (record medium) such as a magnetic disk, an optical disk, a magneto-optic disk or the like, and provide the program to the computer system 1A from the storage unit through a communication path.

When the functions as the color signal value extraction unit 11, the color transformation table creation unit 12 and the extraction order notification unit 13 are realized, the program stored in the internal storage unit (memory 20) is executed by a microprocessor (CPU 10) of the computer. It is alternatively possible at this time that the computer system 1A directly reads the program 21A recorded in the record medium to execute it.

Meanwhile, the application program 21A includes program codes to attain the functions as the color signal value extraction unit 11, the color transformation table creation unit 12 and the extraction order notification unit 13 by the computer system 1A, like the above-described program 21. Apart of the functions maybe realized by an operation system, not by the application program 21A.

The computer system 1A is connected to a color scanner 60 and a colorimeter 70. The color scanner 60 is a color input device that is an object of color transformation table creation in this embodiment. The colorimeter 70 is used to measure each color region CP of a color chart 100 (color patch groups 101) when a color transformation table for a color input device is created, which outputs L*a*b* values (or spectral reflectance factor) as colorimetric values.

According to this embodiment, a color patch region 101 similar to that described above with reference to FIGS. 13 and 14 is printed on a color chart 100 used when a color transformation table for a color input device is created. Information on a state of arrangement of color regions (patches) CP in the color patch region 101 is beforehand stored as patch group arrangement information 23 A in the memory 20.

In the memory 20 of the computer system 1A, image information 22 A of the color chart 100 (color patch groups 101) read by the color scanner 60 and a color transformation table (LUT: Look Up Table) 24 for the color scanner 60 created as will be described later are stored together with the application program 21A and the patch group arrangement information 23A described above.

Next, description will be made of the various functions (the functions as the color signal value extraction unit 11, the color transformation table creation unit 12 and the extraction order notification unit 13) realized by the CPU 10.

The color signal value extraction unit 11 extracts representative color signal values representing each color region CP from each of plural color regions CP in a color chart image obtained by reading a certain color chart 100 by the color scanner 60, using the similar function to that of the color signal value extraction apparatus described above with reference to FIGS. 1 to 14.

The color transformation table creation unit 12 correlates the representative color signal values extracted by the color signal value extraction unit 11 with colorimetic values (L*a*b* values) measured by the colorimeter 70, respectively, in each color region CP to create a color transformation table for the color scanner 60 as shown in, for example, Table 1. The color transformation table created by the color transformation table creation unit 12 is stored as an LUT 24 in the memory 20.

The extraction order notification unit 13 notifies of the order in which the color signal value extraction unit 11 has extracted the respective color signal values (the order in which color regions CP have been selected) the operator using a GUI (Graphical User Interface) function. According to this embodiment, the order is notified to the operator by displaying the number on each color region CP of the color chart image displayed on the display 30, as will be described later with reference to FIG. 19.

Next, description will be made of an operation of the color transformation table creating apparatus 1A in the above structure with reference to FIGS. 16, 17 and 18.

Figure 16:
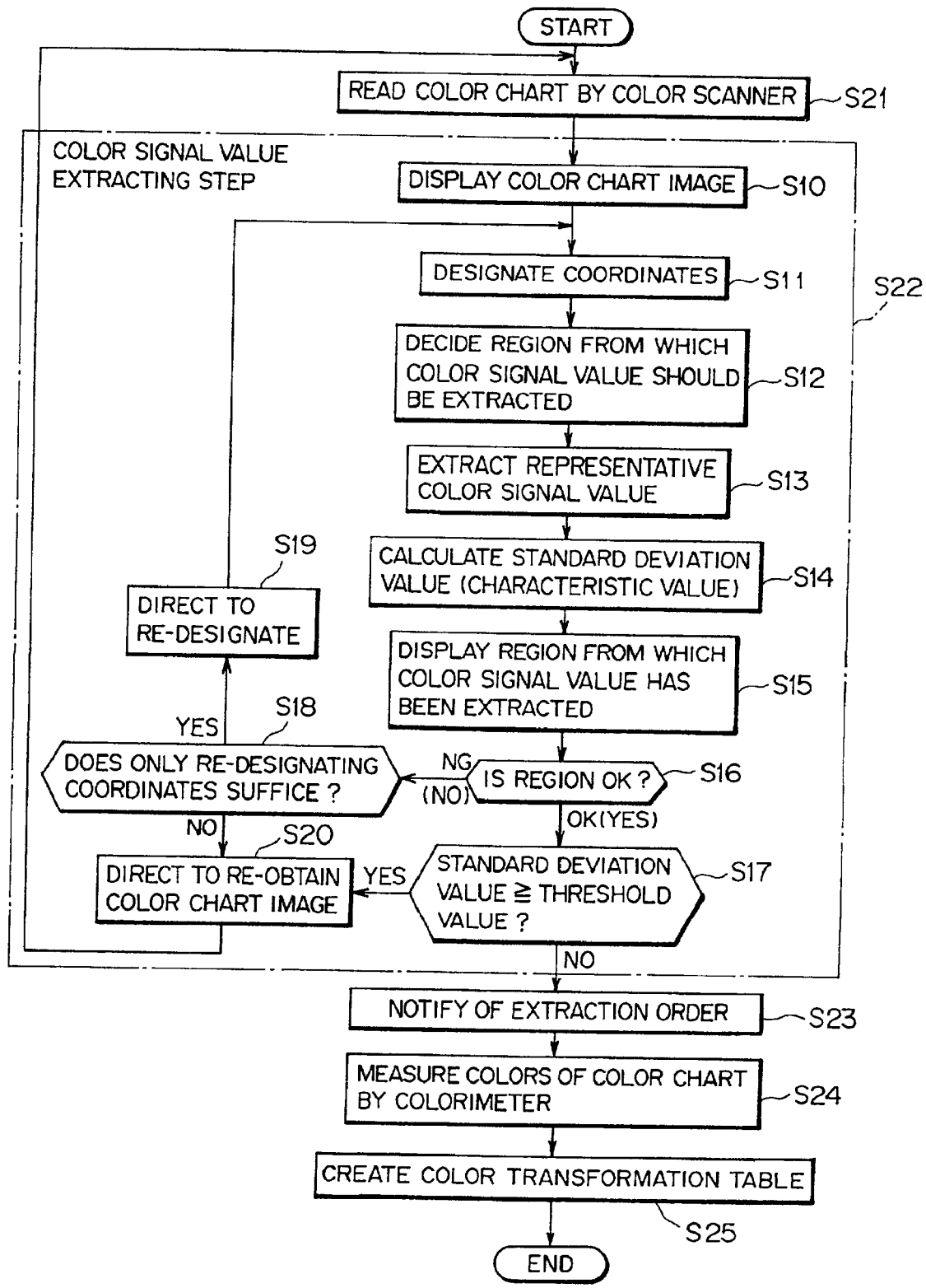
FIG. 16 is a flowchart for illustrating procedures for the method for creating a color transformation table for a color input device according to the embodiment.
Figure 19:
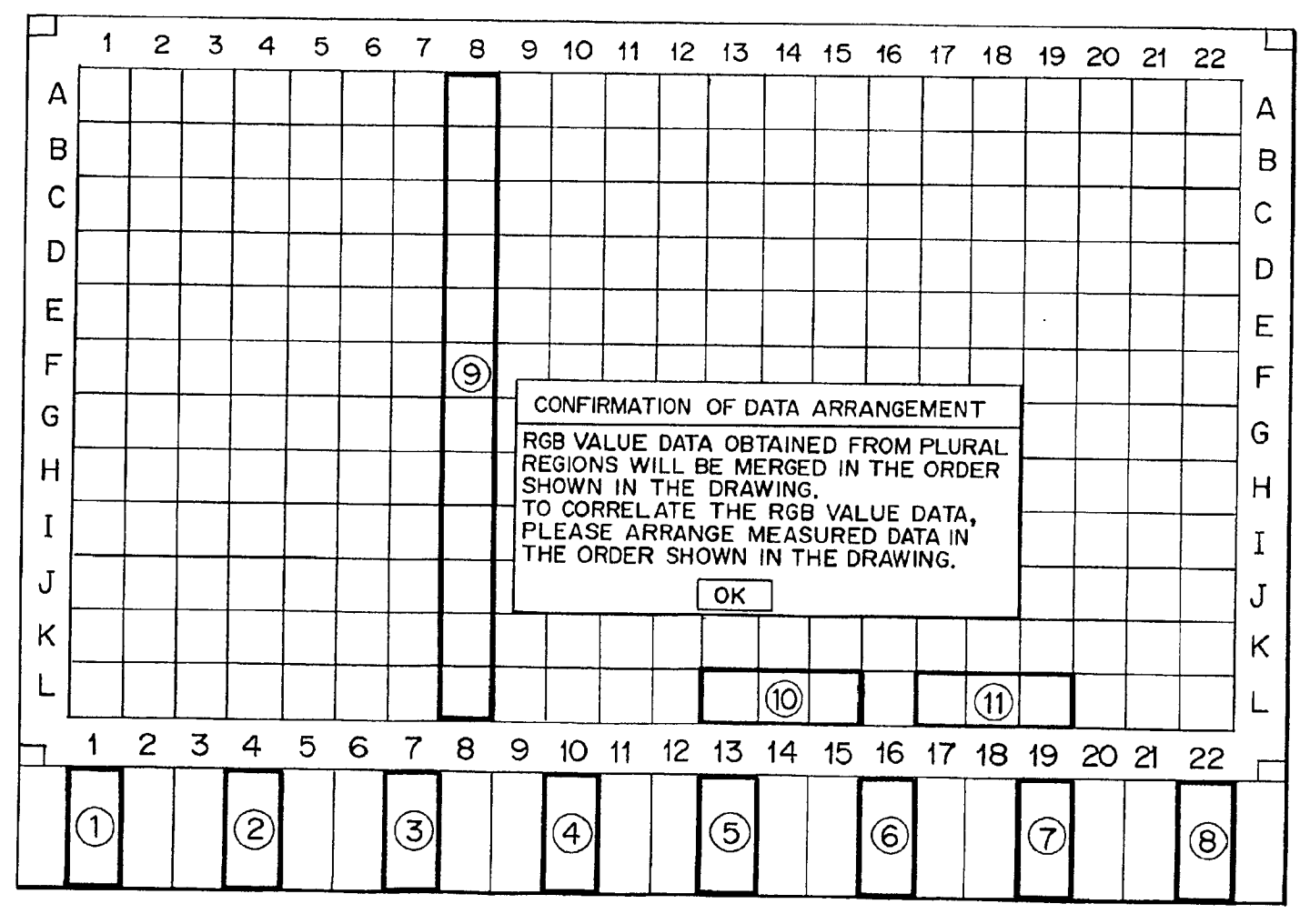

FIG. 16 is a flowchart (steps S21 to S25) for illustrating procedures for the method for creating a color transformation table for a color input device according to this embodiment of this invention. FIG. 17 is a functional block diagram showing a part relating to the method described with reference to FIG. 16 extracted from the apparatus for creating a color transformation table for a color input device 1A according to this embodiment shown in FIG. 15. FIG. 19 is a diagram showing an example of display of a practical extraction order in the apparatus for creating a color transformation table for a color input device 1A according to this embodiment.

Figure 17:
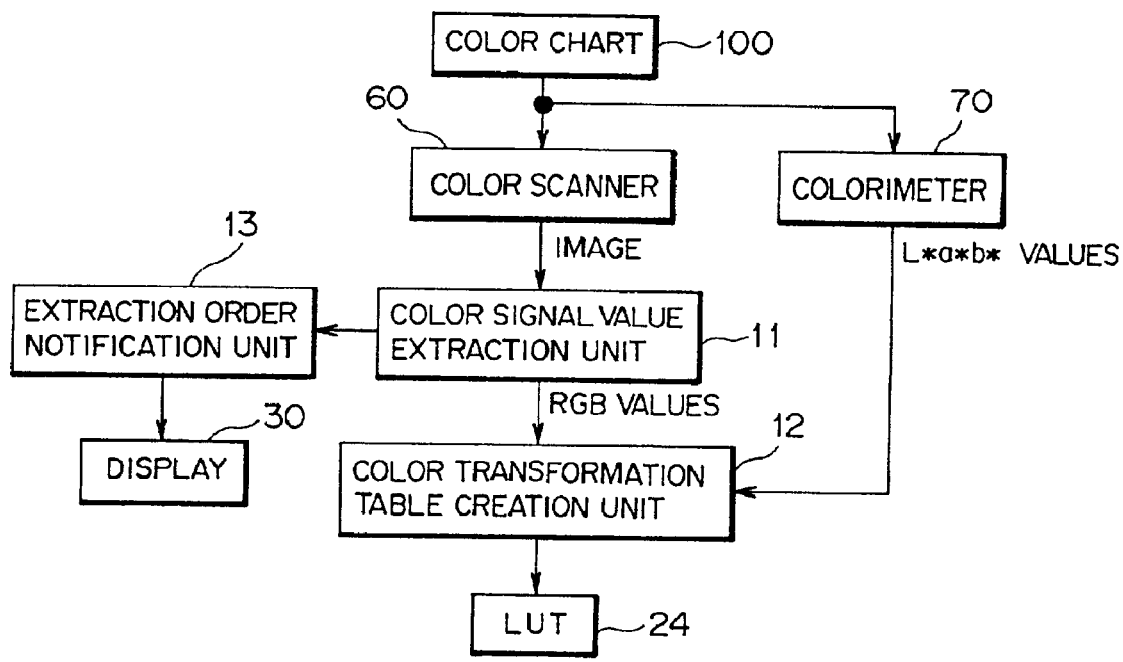
FIG. 17 is a functional block diagram in which a part relating to the method illustrated in FIG. 16 is extracted from the apparatus for crating a color transformation table for a color input device according to the embodiment.

As shown in FIGS. 16 and 17, when a color transformation table for the color scanner 60 is created, a predetermined color chart 100 is first ready by the color scanner 60 to obtain a color patch image (color chart image information 22A, RGB image), and stores it in the memory 20 (step S21; color chart reading step).

The color signal value extraction unit 11 extracts representative color signal values representing a color region CP from each of plural color regions CP in the color chart image read at step S21 according to procedures (steps S10 to S20) described with reference to FIG. 2 (step S22; color signal value extracting step).

At the color signal value extracting step S22 shown in FIG. 16, the operator having received a direction at step S10 returns to step S21, at which the operator again obtains the color chart image (color chart image information 22A) by again reading, for instance, the color chart 100 by the color scanner 60.

When extraction of the representative color signal values is completed at step S22, the extraction order notification unit 13 displays the order in which the representative color signal values have been extracted (the order in which the color regions CP have been selected) at step S22 on the display as shown in, for example, FIG. 19 to notify of it the operator (step S23; notifying step).

FIG. 19 shows a state of display of the display 30 when a color chart read at step S21 is the input target described above with reference to FIGS. 9 and 29. In the example shown in FIG. 19, the order in which representative color signal values have been extracted is displayed with numbers (the numbers in circles 1 to 11) in color regions CP corresponding to the respective sets of representative color signal values.

In FIG. 19, a window for confirmation of data arrangement is displayed in the color chart image. In the window, "RGB value data obtained from plural regions will be merged in the order shown in the drawing. To correlate the RGB value data, please arrange measured data in the order shown in the drawing" is displayed to give the operator advice to meet the order of selection of color regions CP that are to be measured at the next color measuring step S24 with the order of extraction of representative color signal values.

The operator selects color regions CP in the order of selection of the representative color signal values while referring to the screen as shown in FIG. 19 on the display 30, measures colors in each color region CP by the colorimeter 70, and obtains L*a*b* values (or spectral reflectance factor) of each color region CP as colorimetric values (step S24; colorimetric step).

The colorimetric values (L*a*b* values) obtained at step S24 are correlated with the representative color signal values (RGB values) extracted at step S22 in each color region CP by the color transformation table creation unit 12, and a color transformation table (LUT) 24 holding the relationship is created in the memory 20 (step S25; color transformation table creating step). As this, a color transformation table (profile) 24 for the color scanner 60 as shown in FIG.1 is created.

In order to create a high-accuracy color transformation table for a color input device, it is essential to accurately obtain representative color signal values of each patch CP. However, the know software for creating a color transformation table for a color input device cannot check whether or not the software have been able to accurately obtain color signal values, as stated above.

According to the color transform creating method or the color transformation table creating apparatus 1A of this embodiment, when representative color signal values are extracted in order to create a color transformation table 24 for the color scanner 60, the operator refers to a color signal value extracting region E and a color chart image displayed on the display 30, there by visually determining whether the color signal values are extracted from a desirable region (region in the vicinity of the center of the color region CP) in the color region CP in the color chart, and immediately quantitatively determining whether the color signal values are extracted from a desirable region (region in the vicinity of the center of the color region CP) in the color region in the color chart image on the basis of standard deviation values (characteristic values) calculated from the color signal values in the color signal value extracting region E.

It is therefore possible to certainly check correctness of the extracted representative color signal values, and extract and obtain a large number of color signal values accurately and readily. This allows the color transformation table 24 for the color scanner 60 with a high transformation accuracy to be created readily.

Since a large amount of relationship is essential to create the color transformation table 24, the operator (user) might mistake the order in which colorimetric values obtained by the colorimeter 70 should be correlated to extracted representative color signal values. According to this embodiment, the order in which representative color signal values have been extracted is clearly shown on the display 30 to be notified to the operator, so that the operator can correctly correlate the colorimetric values with the representative color signals. Accordingly, it is possible to accurately create the color transformation table 24 for the color scanner 60.

[3] Description of a Method for Creating a Color Transformation Table for a Color Output Device Next, description will be made of creation of a color transformation table (profile) in which relationship between a color space (RGB values; device-dependent color space) of the color printer 80 that is a color output device with a color space independent of a device (for example, L*a*b* values; device-independent color space) is stored.

Relationship of about 5000 colors (to 300000) is generally stored in a color transformation table for a color output device. According to this embodiment, a grid-like color transformation table in the RGB space (RGB space having 17×17×17 grid points) having values in 17 levels of each of RGB colors is created, as shown in the above Table 1. A range of L*a*b* values is classified into 0≦L*≦100, −128≦a*≦127, and −128≦b*≦127. Incidentally, an image outputted from the color scanner 60 is an RGB image, all of the RGB values are integral values from 0 to 255.

Figure 20:
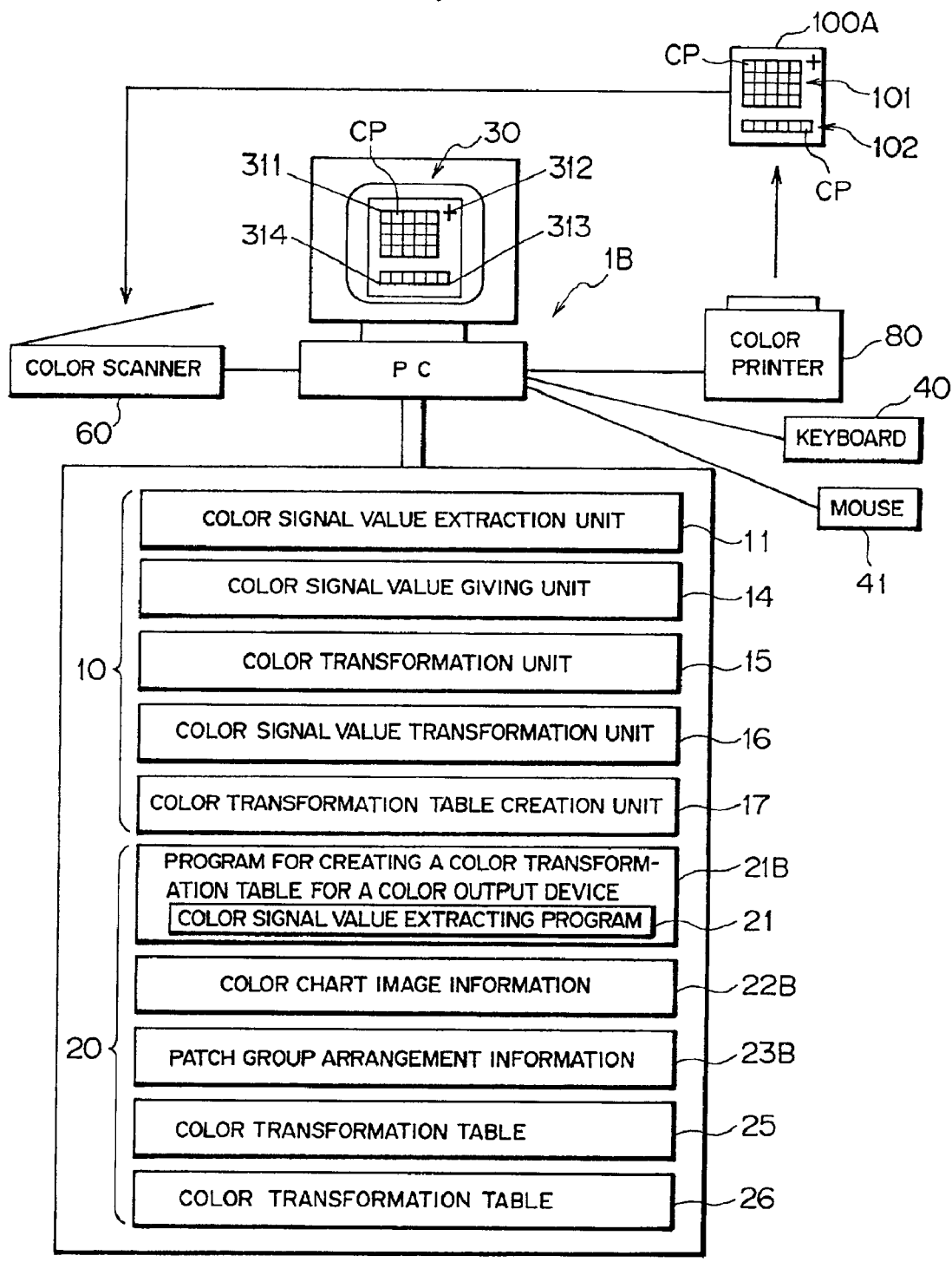
FIG. 20 is a block diagram showing a hardware structure and functional structure of a computer system (apparatus for creating a color transformation table for a color output device) for accomplishing a method for creating a color transformation table for a color output device according to the embodiment of this invention.

FIG. 20 is a block diagram showing a hardware structure and functional structure of a computer system (apparatus for creating a color transformation table for a color output device) for accomplishing a method for creating a color transformation table for a color output device according to the embodiment of the present invention. The computer system (personal computer: PC) 1B shown in FIG. 20 functions as an apparatus for creating a color transformation table for a color printer 80 that is a color output device. Incidentally, like reference characters in FIG. 20 designate like or corresponding parts, detailed descriptions of which are thus omitted.

As shown in FIG. 20, the computer system 1B is similarly structured to the computer system 1 shown in FIG. 1. FIG. 20 shows the structure more schematically.

A memory 20 of the computer system 1B stores an application program (program for creating a color transformation table for color output device) to attain a color signal value extraction unit 11, a color signal value giving unit 14, a color transformation unit 15, a color signal value transformation unit 16 and a color transformation table creation unit 17.

A CPU 10 reads the application program 21 B from the memory 20 through the bus line 50 (refer to FIG. 1) to execute it, thereby realizing functions as the color signal value extraction unit 11, the color signal value giving unit 14, the color transformation unit 15, a color signal value transformation unit 16 and the color transformation table creation unit 17 (details of which will be described later), that is, a function as the apparatus for creating a color transformation table for a color output device, and executing the method for creating a color transformation table for a color output device.

The application program 21B includes the above color signal value extracting program 21 to realize a function as the color signal value extraction unit 11 by the CPU 10.

The above application program 21B is provided as a form of a computer readable record medium such as a flexible disk, a CD-ROM or the like in which the application program 21B is recorded, like the above program 21. The computer system 1B reads the program 21B from the record medium, transfers and stores it in an internal storage unit or an external storage unit to use the same. Alternatively, the program 21B may be recorded in a storage unit (record medium) such as a magnetic disk, an optical disk, a magneto-optic disk or the like, and provided to the computer system 1B from the record medium through a communication path.

When the functions as the color signal value extraction unit 11, the color signal value giving unit 14, the color transformation unit 15, the color signal value transformation unit 16 and the color transformation table creation unit 17 are realized, the program 21B stored in the internal storage unit (memory 20) is executed by a microprocessor (CPU 10) of the computer. At this time, the computer system 10B may directly read the program 21B recorded in the record medium to execute it.

The application program 21B includes program codes to cause the computer system 1B to attain the functions as the color signal value extraction unit 11, the color signal value giving unit 14, the color transformation unit 15, the color signal value transformation unit 16 and the color transformation table creation unit 17, like the above program 21. A part of the functions may be attained by an operation system, not by the application program 21B.

The computer system 1B is connected to a color scanner 60 and a color printer 80. The color printer 80 is a color output device that is an object of color transformation table creation in this embodiment. The color scanner 60 is used to read a predetermined color chart 100A outputted from the color printer 80 when a color transformation table for a color output device is created. The color scanner 60 inputs an RGB image as a color chart image (color chart image information 22B) to the computer system 1B.

According to this embodiment, 17×17×17 color patches CP [a color patch region 101 and a gray patch group (gradation original) 102 ] having values in 17 levels for each of RGB colors to be stored in a color transformation table to be created are printed on a color chart 100A outputted from the color printer 80 when a color transformation table for a color output device is created. When coordinates of a color chart image are designated by the color signal value extraction unit 11, four points 311, 312, 313 and 314 are designated. Information on a state of arrangement of the four points 311, 312, 313 and 314, and information on a state of arrangement of color regions (patches) CP in the color patch region 101 and the gray patch group 102 are beforehand stored as patch group arrangement information 23B in the memory 20.

The memory 20 of the computer system 1B stores image information 22B of the color chart 100A read by the color scanner 21B, a color transformation table (table for transforming scanner output RGB values into L*a*b* values) 25 for the color scanner 60, and a color transformation table (LUT: Look Up Table) 26 for the color printer 80 created as will be described later, along with the application program 21B and the patch group arrangement information 23B. As the color transformation table 25, here is used one created in the method for creating a color transformation table for a color input device according to this embodiment described above with reference to FIGS. 15 to 19, for example.

Next, description will be made of various functions (functions as the color signal value extraction unit 11, the color signal value giving unit 14, the color transformation unit 15, the color signal value transformation unit 16 and the color transformation table creation unit 17) accomplished by the CPU 10.

The color signal value giving unit 14 gives predetermined color signal values (RGB values) to the color printer 80 in order that the color printer 80 outputs a predetermined color chart 100A.

The color transformation unit 15 transforms image information (RGB image) 22B of the color chart 100A read by the color scanner 60 into an image (L*a*b* image) expressed in a device-independent color space on the basis of the color transformation table 25 for the color scanner 60.

The L*a*b* image obtained at this time by the color transformation unit 15 is expressed by L*a*b* values (color signal values; hereinafter referred to as integral L*a*b* values) expressed by integral values equal to or larger than zero.

The color signal value extraction unit 11 extracts representative color signal values (integral L*a*b* values) of each color region CP from each of plural color regions CP in the color chart image (L*a*b* image) transformed by the color transformation unit 15, using a function similar to that of the color signal value extracting apparatus described above with reference to FIGS. 1 to 14.

The color signal value transformation unit 16 transforms the representative color signal values extracted by the color signal value extraction unit 11 into values (hereinafter referred to as real number L*a*b* values) corresponding actual colorimetric values, respectively. In more detail, the color signal value transformation unit 16 transforms an integral L*a*b* value being an integral value from 0 to 255 extracted by the color signal value extraction unit 11 into a real number L*a*b* value using each of the following equations (12) to (14):

$$\text{real number } L^* \text{ value} = \text{integral } L^* \text{ value}/2.55 \quad (12)$$

$$\text{real number } a^* \text{ value} = \text{integral } a^* \text{ value} - 128 \quad (13)$$

$$\text{real number } b^* \text{ value} = \text{integral } b^* \text{ value} - 128 \quad (14)$$

The color transformation table creation unit 17 correlates predetermined color signal values (RGB values) given to the color printer 80 by the color signal value giving unit 14 with representative color signal values extracted by the color signal extraction unit 11 and transformed into actual L*a*b* values by the color signal value transformation unit 16 in each color region CP to create a color transformation table for the color printer 80 as shown in, for example, the above Table 1. The color transformation table created by the color transformation table creation unit 17 is stored as an LUT 26 in the memory 20.

Next, description will be made of an operation of the color transformation table creating apparatus 1B in the above structure with reference to FIGS. 21 and 22.

Figure 21:
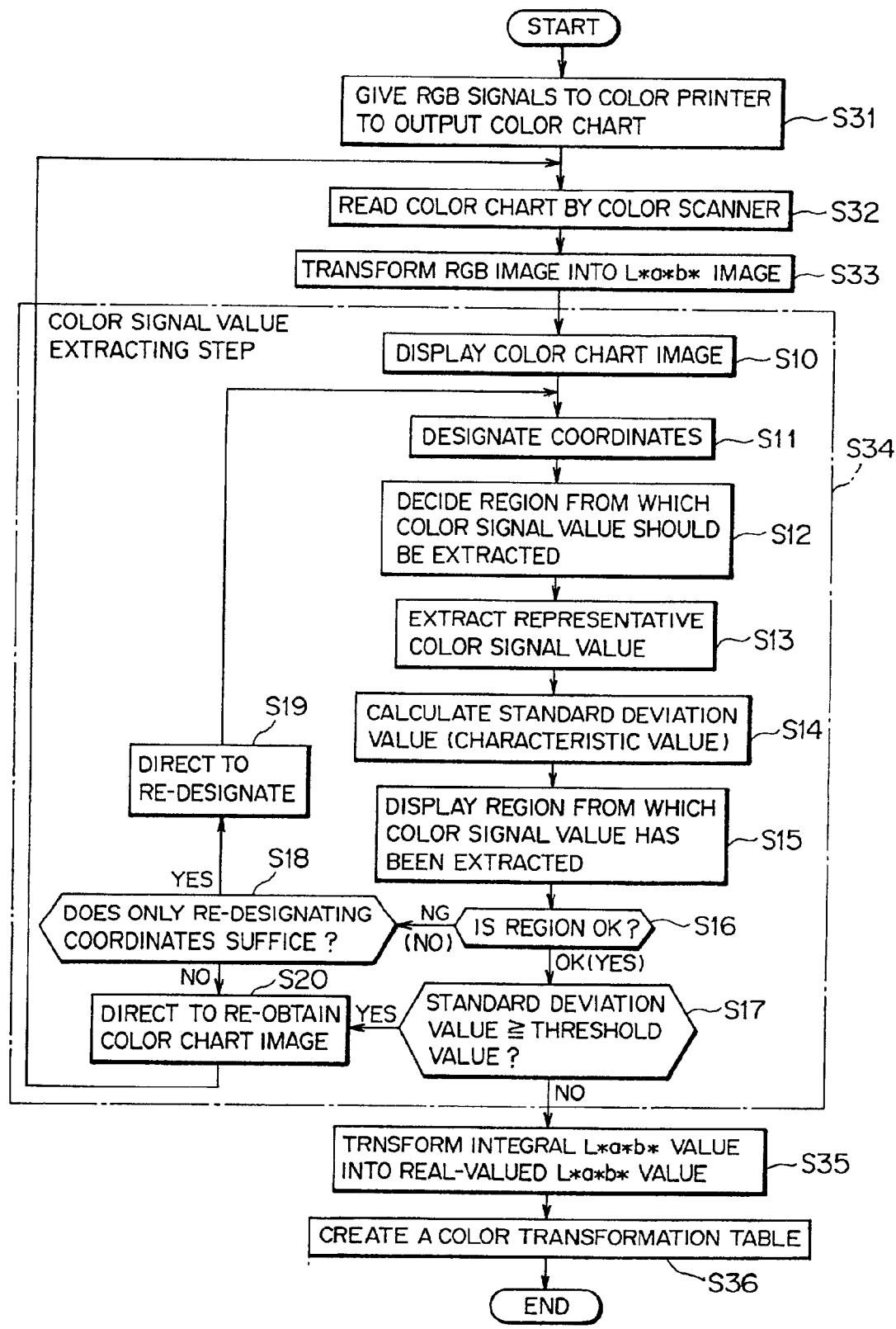
FIG. 21 is a flowchart for illustrating procedures for the method for creating a color transformation table for a color output device according to the embodiment of this invention.

FIG. 21 is a flowchart (steps S31 to S36) for illustrating procedures for a method for creating a color transformation table for a color output device according to this embodiment of the present invention. FIG. 22 is a functional block diagram showing a part relating to the method described with reference to FIG. 21 extracted from the apparatus for creating a color transformation table for a color output device according to this embodiment shown in FIG. 20.

Figure 22:
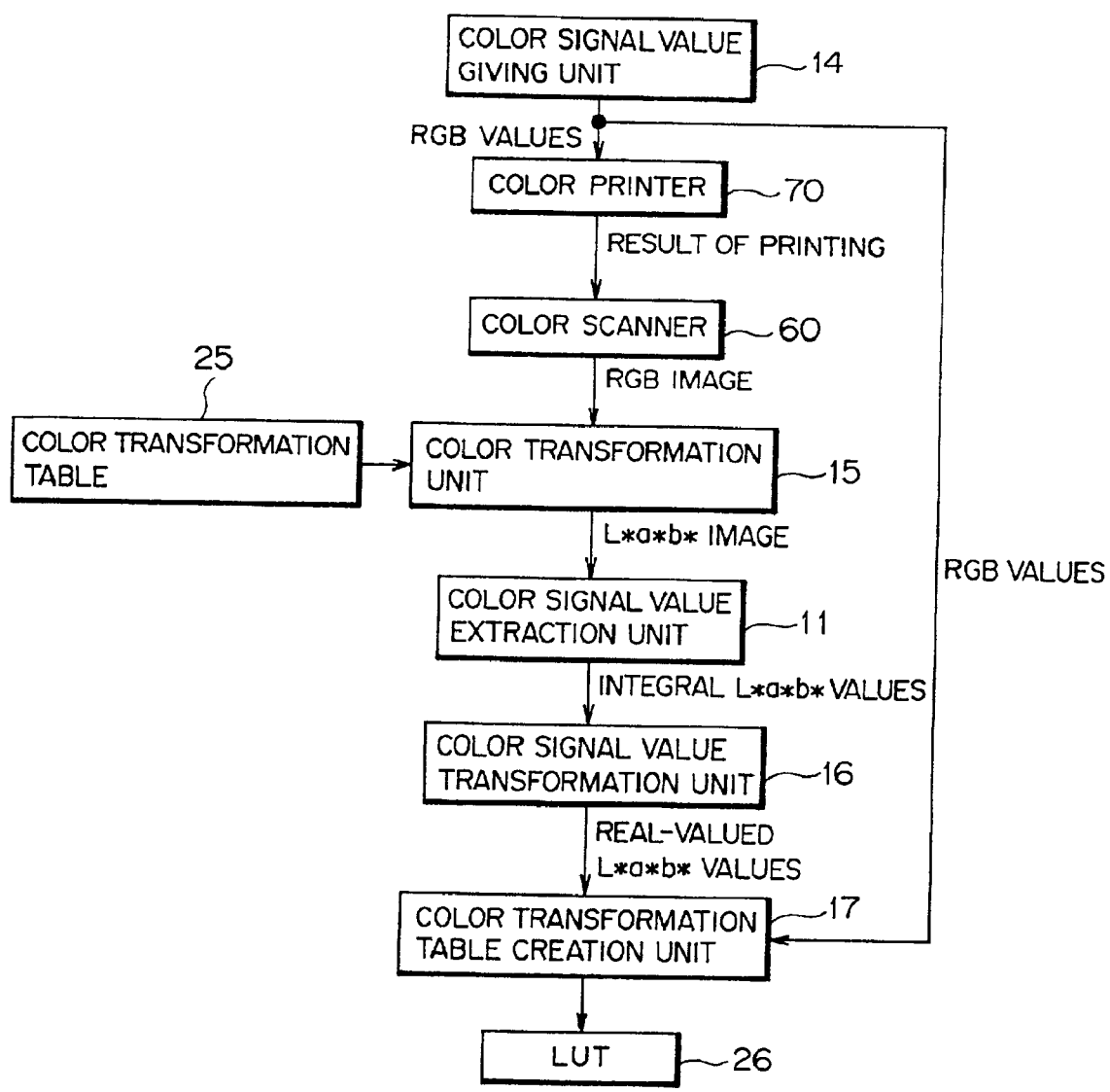
FIG. 22 is a functional block diagram in which a part relating to the creating method shown in FIG. 21 is extracted from the apparatus for creating a color transformation table for a color output device according to the embodiment.

As shown in FIGS. 21 and 22, when a color transformation table for the color printer 80 is created, the color signal value giving unit 14 of the CPU 10 gives necessary RGB values to the color printer 80 in order to print a predetermined color chart 100A, and causes the color printer 80 to output the color chart 100A (step S31; color chart outputting step).

The color chart 100A outputted from the color printer 80 is read into the computer system 1B by the color scanner 60 to obtain a color patch image (color chart image information 22B, RGB image). The color patch image is stored in the memory 20 (step S32; color chart reading step).

After that, the color transformation unit 15 converts color signal values (RGB values) in the color patch image obtained at step S32 into integral L*a*b* values expressed in a device-independent color space according to the color transformation table 25 of the color scanner 60, so that the color patch image is transformed from an RGB image into an L*a*b* image (step S33; color transforming step).

Next, the color signal value extraction unit 11 extracts representative color signals (integral L*a*b* values) representing each color region CP from each of plural color regions CP in the color chart image (integral L*a*b* image) obtained at step S33 according to the procedures (steps S10 to S20) described above with reference to FIG. 2 (step S34; color signal value extracting step).

Note that when coordinates of the color chart image are designated at step S10, four points 311, 312, 313 and 314 in the corners of the color chart image, whose colors are transformed at step S33, are designated using the mouse 41 or the like at a color signal value extracting step S34 shown in FIG. 21. At step S12, the region determination unit 11a obtains image coordinates of the four points 311 to 314, and specifies and recognizes coordinates of the center C0 of each patch CP and a size of each patch (rectangle) CP on the basis of the image coordinates and the patch group arrangement information 23B. The operator having received a direction at step S20 returns to step S32, and again obtains the color patch image (color chart image information 22B) by again reading, for instance, the color chart 100A by the color scanner 60.

When extraction of the representative color signal values is completed at step S34, the color signal value transformation unit 16 transforms the representative color signal values (integral L*a*b* values) extracted at step S34 into real number L*a*b* values corresponding to actual colorimetric values using the above equations (12) to (14) (step S35; color signal value transforming step).

The real number L*a*b* values obtained at step S35 are correlated with color signal values (RGB values) given to the color printer 80 at step S31 by the color transformation table creation unit 17 in each color region CP, and a color transformation table (LUT) 26 holding the relationship is created in the memory 20 (step S36; color transformation table creating step). As this, the color transformation table (profile) 26 for the color printer 80 as shown in Table 1 is created.

According to the color transformation table creating method and the color transformation table creating apparatus 1B of this embodiment, values corresponding to colorimetrics values of the color chart 100A outputted from the color printer 80 are read into the computer system 1B by the color scanner 60, and extracted as the representative color signal values (L*a*b* values) of each color region CP at the color transforming step S33 and the color signal value extracting step S34 described above. It is therefore possible to omit a process of actually measuring the color chart 100A outputted from the color printer 80 by a colorimeter.

Namely, all color regions (patches) PC of the color chart 100A are instantaneously read by using the color scanner 60, and values corresponding to colorimetric values are obtained for each color region PC. Accordingly, a time or labor required for colorimetry is largely decreased, and the color transformation table 26 for the color printer 80 is readily created within a quite short time.

The color signal values (values corresponding to colorimetric values; L*a*b* values) obtained by the color transformation unit 15 are generally integral values equal to or larger than zero due to a relationship with a format of the image, which cannot be used as data as they are. According to this embodiment, the color signal value transformation unit 16 automatically transforms color signal values that are integral L*a*b* values into real number L*a*b* values (integral values including negative values, or real number values) corresponding to actual colorimetric values, whereby the color transformation table 26 which can be immediately used in the actual color transforming process is created within a short time.

When color signal values are extracted in order to create the color transformation table 26 for the color printer 80, the operator refers to the color signal value extracting region E and the color patch image displayed on the display 30, thereby immediately visually determining whether the color signal values are extracted from a desirable region (region in the vicinity of the center of the color region CP) in the color region CP in the color patch image, and immediately quantitatively determining whether the color signal values are extracted from a desirable region (region in the vicinity of the center of the color region CP) in the color region CP in the color patch image on the basis of standard deviation values (characteristic values) calculated from color signal values in the color signal value extracting region E.

Accordingly, it is possible to certainly check correctness of the extracted representative color signal values, and extract and obtain a large number of color signal values accurately and readily, which allows the color transformation table 26 for the color printer 80 with high color transformation accuracy to be created readily.

Next, description will be made of a modification of the method for creating a color transformation table for a color output device according to this embodiment with reference to FIGS. 23 and 24.

Figure 23:
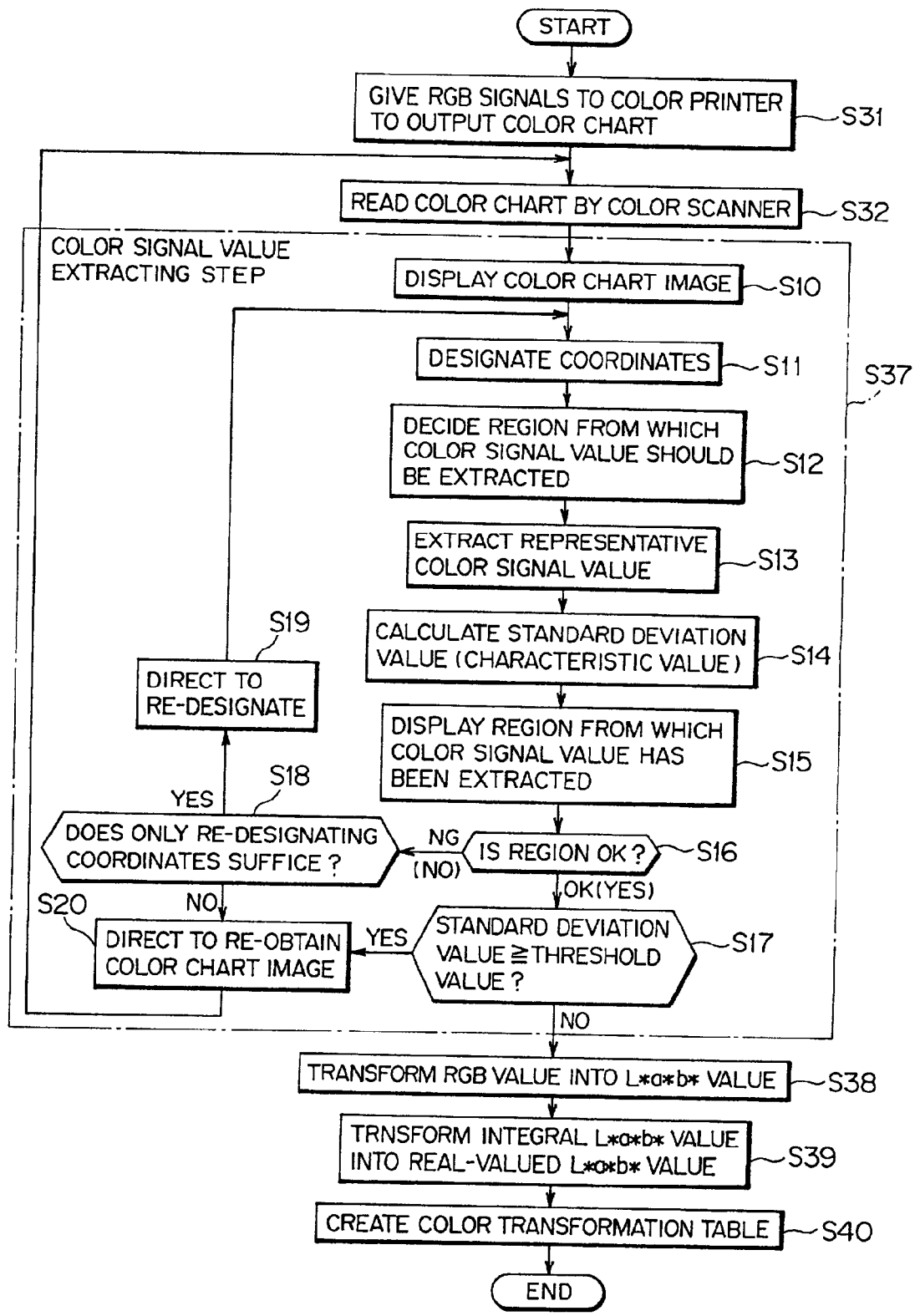
FIG. 23 is a flowchart for illustrating a modification of the procedures for the method for creating a color transformation table for a color output device according to the embodiment of this invention.

FIG. 23 is a flowchart (steps S31, S32, and S37 to S40) for illustrating a modification of the procedures for the method for creating a color transformation table for a color output device according to this embodiment of the present invention. FIG. 24 is a functional block diagram showing a part relating to the method described with reference to FIG. 23 extracted from the apparatus for creating a color transformation table for a color output device 1B according to this embodiment shown in FIG. 20.

In the color transformation table creating method described above with reference to FIGS. 21 and 22, the color transformation unit 15 transforms an RGB image of the color chart 100A read by the color scanner 60 into an L*a*b* image, the color signal value extraction unit 11 extracts representative color signal values (integral L*a*b* values) representing each color region CP from each of plural color regions CP in the color chart image (L*a*b* image) transformed by the color transformation unit 15, and the color signal value transformation unit 16 transforms the representative color signal values extracted by the color signal value extraction unit 11 from integral L*a*b* values into real number L*a*b* values.

In contrast, in the color transformation table creating method that will be described later with reference to FIGS. 23 and 24, the color signal value extraction unit 11 extracts representative color signal values (RGB values) representing each color region CP from each of plural color regions CP in the RGB image of the color chart 101A read by the color scanner 60, the color transformation unit 15 transforms the representative color signal values (RGB values) extracted by the color signal value extraction unit 11 into integral L*a*b* values, and the color signal value transformation unit 16 transforms the representative color signal values obtained by the color transformation unit 15 from integral L*a*b* values into real number L*a*b* values.

Figure 24:
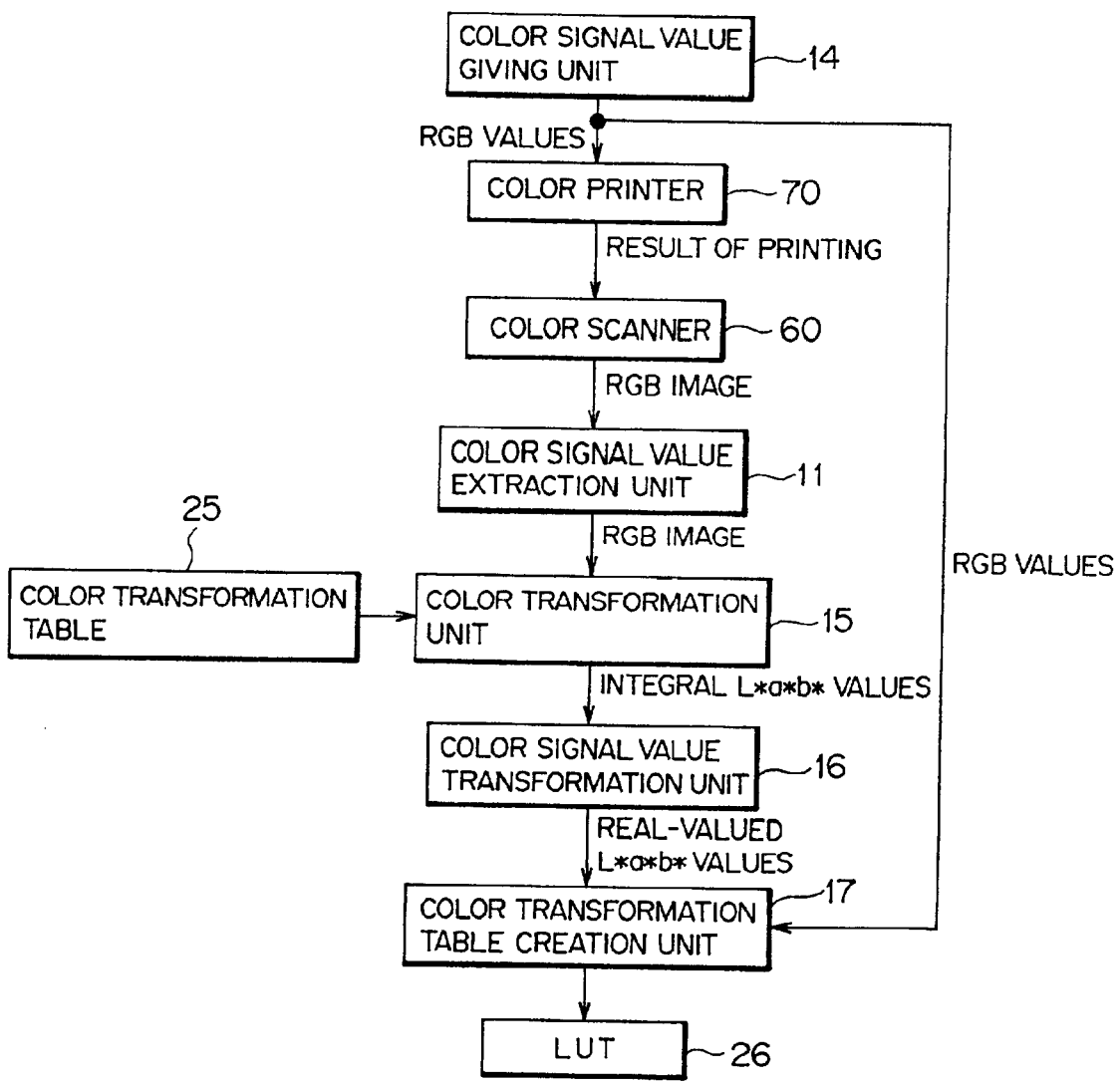
FIG. 24 is a functional block diagram in which a part relating to the method illustrated in FIG. 23 is extracted from the apparatus for creating a color transformation table for a color output device according to the embodiment.

Namely, when a color transformation table for the color printer 80 is created in the above modified method, the color signal value giving unit 14 of the CPU 10 gives RGB values necessary to print a predetermined color chart 100A to the color printer 80, and causes the color printer 80 to output the color chart 100, as shown in FIGS. 23 and 24 (step S31; color chart outputting step).

The color chart 100A outputted from the color printer 80 are then read into the computer system 1B by the color scanner 60 to obtain a color patch image (color chart image information 22B, RGB image), and the color patch image is stored in the memory 20 (step S32; color chart reading step).

After that, the color signal value extraction unit 11 extracts representative color signal values (RGB values) representing each color region CP from each of plural color regions CP in the color chart image (RGB image) obtained at step S32 according to the procedure (steps S10 to S20) described above with reference to FIG. 2 (step S37; color signal value extracting step). Incidentally, the similar process to step S34 in FIG. 21 is basically performed at the color signal value extracting step S37.

When extraction of the representative color signal values is completed at step S37, the color transformation unit 15 transforms the representative color signal values extracted at step S37 from RGB values into integral L*a*b* values on the basis of the color transformation table 25 for the color scanner 60 (step S38; color transforming step).

The color signal value transformation unit 16 then transforms the representative color signal values obtained at step S38 from integral L*a*b* values into real number L*a*b* values corresponding to actual colorimetric values by using the above equations (12) to (14) (step S39; color signal value transforming step).

Similarly to the step S36 in FIG. 21, the color transformation table creation unit 17 correlates the real number L*a*b* values obtained at step S39 with the color signal values (RGB values) given to the color printer 80 at step S31 for each color region CP, and the color transformation table (LUT) 26 is created in the memory 20 (step S40; color transformation table creating step).

The modified color transformation table creating method according to this embodiment provides the following functions and effects similar to those provided by the above embodiment.

In the above embodiment, the color transformation unit 15 transforms the whole color chart image obtained by the color scanner 60 from an RGB image into an L*a*b* image. In contrast, the color transformation unit 15 according to this modification transforms only representative color signal values extracted by the color signal value extraction unit 11 from RGB values into integral L*a*b* values, whereby the color transformation table 26 for the color printer 80 can be created within a shorter time.

[4] Description of a Gradation Maintainability Checking Method

Figure 25:
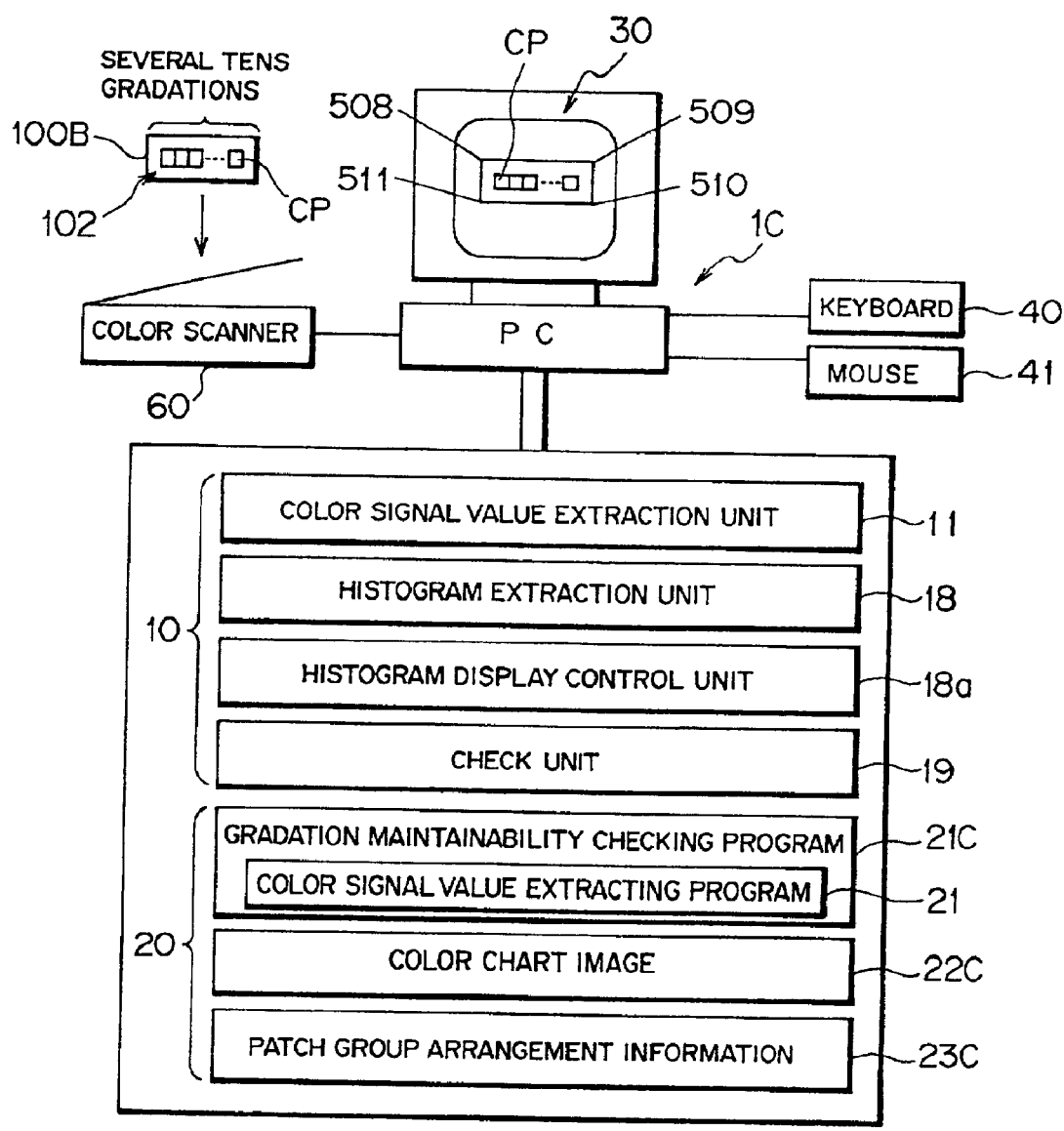
FIG. 25 is a block diagram showing a hardware structure and functional structure of a computer system (gradation maintainability checking apparatus) for accomplishing a gradation maintainability checking method according to the embodiment of this invention.

FIG. 25 is a block diagram showing a hardware structure and functional structure of a computer system (gradation maintainability checking apparatus) for accomplishing a gradation maintainability checking method according to this embodiment of the present invention. The computer system (personal computer: PC) 1C shown in FIG. 25 functions as an apparatus for checking gradation maintainability of the color scanner 60 that is a color input device. Incidentally, like reference characters in FIG. 25 designate like or corresponding parts, detailed descriptions of which are thus omitted.

As shown in FIG. 25, the computer system 1C is in the similar structure to the computer system 1 shown in FIG. 1. In FIG. 25, the structure is more schematically shown.

A memory 20 of the computer system 1C stores an application program (gradation maintainability checking program) 21C for accomplishing a color signal value extraction unit 11, a histogram extraction unit 18, a histogram display control unit 18a and a check unit 19.

A CPU 10 reads the application program 21C from the memory 20 through the bus line 50 (refer to FIG. 1) to execute the same, thereby accomplishing functions (detailed descriptions of which will be described later) as the color signal value extraction unit 11, the histogram extraction unit 18, the histogram display control unit 18a and the check unit 19, that is, a function as the gradation maintainability checking apparatus. The gradation maintainability checking method according to this embodiment is thereby performed.

The application program 21C includes the above-described color signal value extracting program 21 to accomplish the function as the color signal value extraction unit 11 by the CPU 10.

The above application program 21C is provided in a form of a computer readable record medium such as a flexible disk, a CD-ROM or the like in which the application program 21C is recorded, like the above-described program 21. The computer system 1c reads the program 21C from the record medium, transfers and stores the program 21C in an internal storage unit or an external storage unit to use the same. The program 21C may be recorded in a storage unit (record medium) such as a magnetic disk, an optical disk, a magneto-optic disk or the like, and provided to the computer system 1C from the storage unit through a communication path.

When the functions as the color signal value extraction unit 11, the histogram extraction unit 18, the histogram display control unit 18a and the check unit 19 are attained, the program 21C stored in the internal storage unit (memory 20) is executed by a microprocessor (CPU 10) of the computer. The computer system 1C may directly read the program 21C recorded in the record medium to execute it.

The application program 21C includes program codes to accomplish the functions as the color signal value extraction unit 11, the histogram extraction unit 18, the histogram display control unit 18a and the check unit 19, like the above program 21. A part of the functions may be accomplished by an operation system, not by the application program 21C.

The computer system 1C is connected to a color scanner 60 that is an object of gradation maintainability check. The color scanner 60 reads a predetermined color chart 100B on which a gray patch region (gradation original) 102 is printed, and inputs an RGB image of the color chart 100B as a color chart image (color chart image information 22C) to the computer system 1C when the gradation maintainability is checked.

In this embodiment, the gray patch region 102 of the color chart 100B includes gray patches CP in several tens of gradations. According to this embodiment, when the color signal value extraction unit 11 designates coordinates of the color chart image, four points 508, 509, 510 and 511 are designated. Information on a state of arrangement of the four points 508, 509, 510 and 511 and information on a state of arrangement of color regions (patches) CP in the gray patch group 102 are beforehand stored as patch group arrangement information 23C in the memory 20.

The memory 20 of the computer system 1C stores image information 22C of the color chart 100B read by the color scanner 60 along with the application program 21C and the patch group arrangement information 23C described above.

Next, description will be made of various functions (functions as the color signal value extraction unit 11, the histogram extraction unit 18, the histogram display control unit 18a and the check unit 19) accomplished by the CPU 10.

The color signal value extraction unit 11 extracts representative color signal values representing each color region CP from each of plural color regions (gray patches) configuring gradations in a color chart image obtained by reading the predetermined color chart 100B by the color scanner 60, by using the similar function to the color signal value extraction unit described above with reference to FIGS. 1 to 14.

Figure 28:
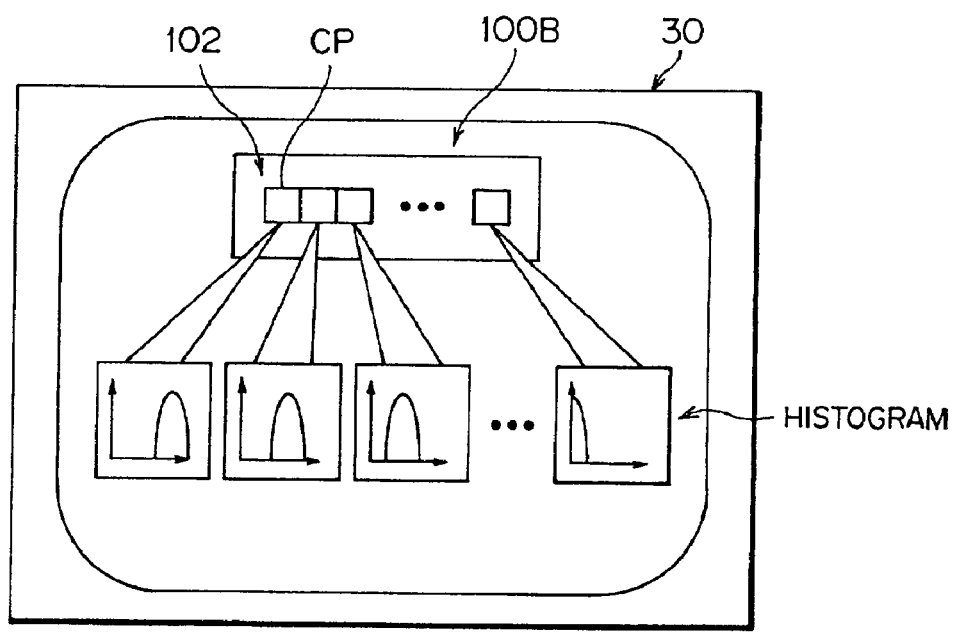
FIG. 28 is a diagram showing an example of concrete display of histograms in the gradation maintainability checking apparatus according to the embodiment.

The histogram extraction unit 18 extracts a histogram of color signal values in the color signal value extracting region E in each color region CP. The histogram display control unit 18 a controls a state of display of the display 30 to display the histogram of each color region CP extracted by the histogram extraction unit 18, as shown in FIG. 28. FIG. 28 is a diagram showing an example of display of practical histograms in the gradation maintainability checking apparatus 1C according to this embodiment.

The check unit 19 checks gradation maintainability of the color scanner 60 on the basis of the representative color signal values extracted by the color signal value extraction unit 11 and in consideration of histograms extracted by the histogram extraction unit 18. According to this embodiment, the operator referring to the histograms displayed on the display 30 and operates a keyboard 40 or a mouse 41, so that a state of the histograms is reflected to evaluation of the gradation maintainability of the color scanner 60.

Next, an operation of the gradation maintainability checking apparatus 1C in the above structure will be described with reference to FIGS. 26 and 27.

Figure 26:
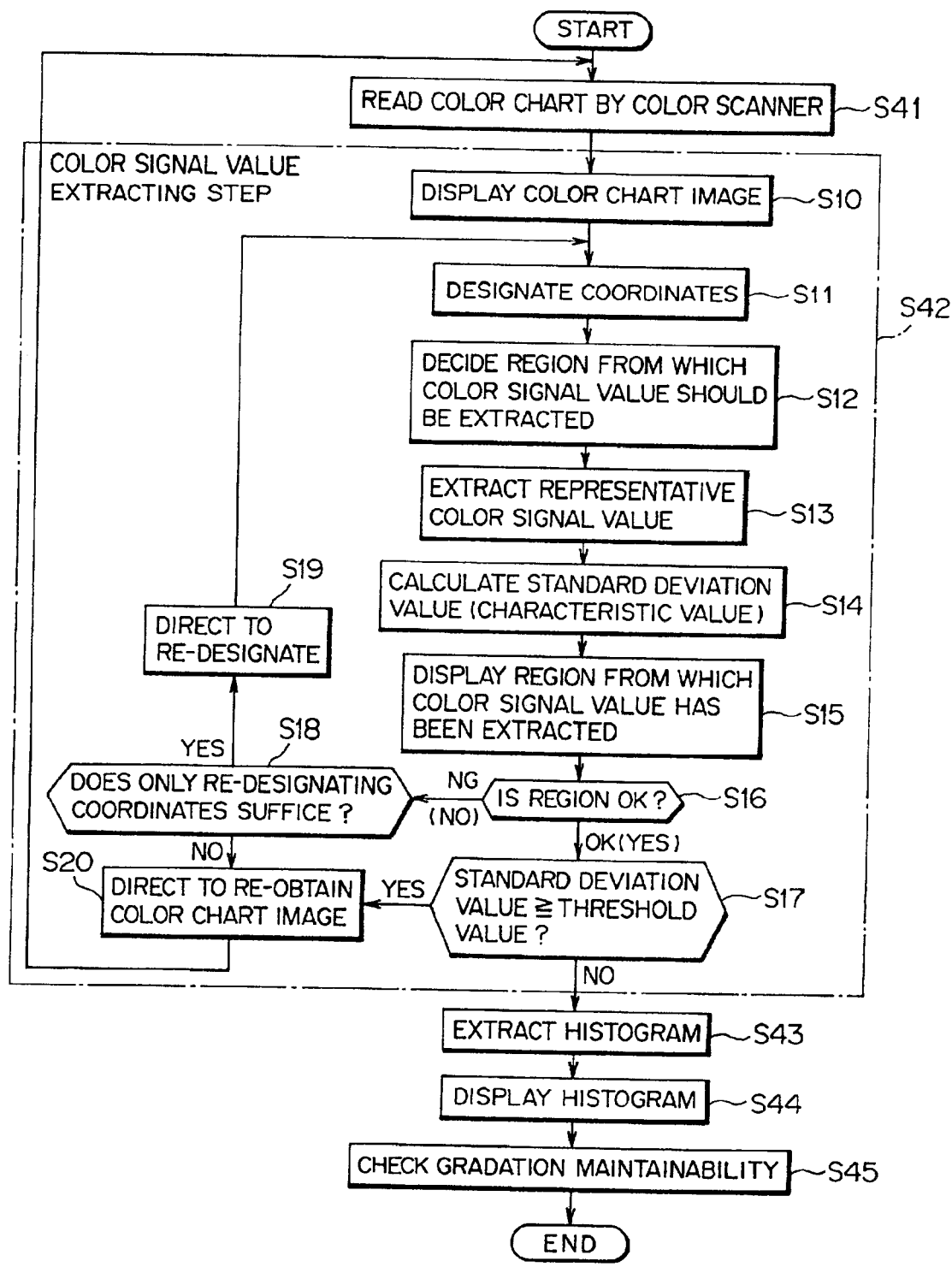
FIG. 26 is a flowchart for illustrating procedures for the gradation maintainability checking method according to the embodiment of this invention.

FIG. 26 is a flowchart (steps S41 to S45) for illustrating procedures for the gradation maintainability checking method according to this embodiment of the present invention. FIG. 27 is a functional block diagram showing a part relating to the method described with reference to FIG. 26 extracted from the gradation maintainability checking apparatus 1C of this embodiment shown in FIG. 25.

Figure 27:
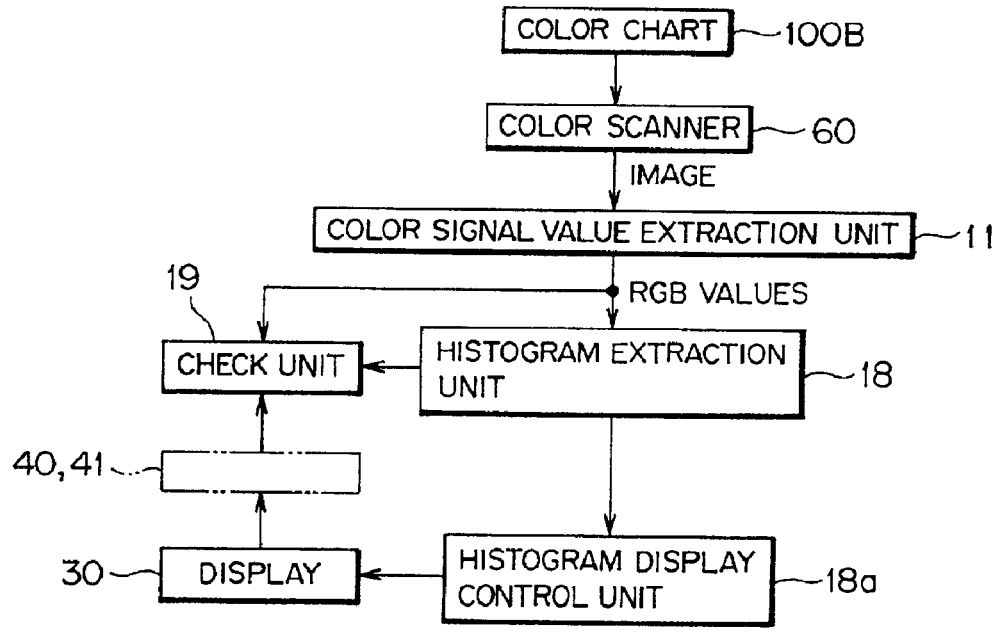
FIG. 27 is a functional block diagram in which a part relating to the method illustrated in FIG. 26 is extracted from the gradation maintainability checking apparatus according to the embodiment.

As shown in FIGS. 26 and 27, when gradation maintainability of the color scanner 60 is checked, a color chart 100B including the gray patch region 102 is read into the computer system 1C by the color scanner 60 to obtain a gray patch image (color chart image information 22 C, RGB image), and the gray patch image is stored in the memory 20 (step S41; color chart reading step).

After that, the color signal value extracting unit 11 extracts representative color signal values representing each color region CP from each of plural color regions (gray patches) CP in the gray patch image obtained at step S41 in the procedures (steps S10 to S20) described above with reference to FIG. 2 (step S42; color signal value extracting step).

When coordinates of the color chart image are designated at step S10, points in four corners 508, 509, 510 and 511 of the gray patch image obtained at step S41 are designated using the mouse 41 or the like at a color signal value extracting step S42 in FIG. 26. At step S12, the region determination unit 11a obtains image coordinates of the four points 508 to 511, and specifies and recognizes coordinates of the center of each patch CP and a size of each patch (rectangle) CP on the basis of the image coordinates and the patch group arrangement information 23C. The operator having received a direction at step S20 returns to step S41, where the operator again obtains the gray patch image (color chart image information 22C) by reading, for instance, the color chart 100B by the color scanner 60.

When extraction of the representative color signal values is completed at step S42, the histogram extraction unit 18 extracts and creates a histogram of the color signal values in the color signal value extracting region E of each color region (gray patch) CP (step S43; histogram extracting step). Here, a histogram extracting process is performed after the representative color signal values are extracted. However, the histogram extracting process may be performed at the same time that the representative color signal values are extracted at step S42.

The histogram of each color region CP extracted at step S43 is displayed on the display 30 by the histogram display control unit 18a, as shown in, for example, FIG. 28 (step S44).

After that, the check unit 19 checks gradation maintainability of the color scanner 60, on the basis of the representative color signal values extracted by the color signal value extraction unit 11 and in consideration of the histograms extracted by the histogram extraction unit 18 (step S45; checking step).

The check unit 19 examines whether the representative color signal values extracted from gray patches CP in the gray patch region 102 change in the order of gradation levels of the gray patches CP, that is, whether inversion of the representative color signal values occurs or not, so as to automatically check gradation maintainability of the color scanner 60.

The operator referring to the histograms displayed on the display 30 operates the keyboard 40 or the mouse 41 to input determination based on shapes of the histograms to the check unit 19. Whereby, a state of the histograms can be reflected to evaluation of the gradation maintainability of the color scanner 60 by the check unit 19.

According to the gradation maintainability checking method and the gradation maintainability checking apparatus 1C of this embodiment, when checking gradation maintainability of the color scanner 60, the operator refers to the color signal value extracting region E and the gray patch image displayed on the display 30 to immediately visually determine whether the color signal values are extracted from a desirable region (region in the vicinity of the center of a color region CP) in the gray patch CP in the gray patch image, and to immediately quantitatively determine whether the color signal values are extracted from a desirable region (region in the vicinity of the center of a color region CP) in a gray patch CP in the gray patch image on the basis of standard deviation values (characteristic values) calculated from the color signal values in the color signal value extracting region E.

Accordingly, it is possible to certainly check correctness of the extracted representative color signal values, thus to extract and obtain the color signal values accurately and readily. It is therefore possible to check gradation maintainability that is characteristics of the color scanner 60 highly accurately (with high evaluation accuracy).

At this time, it cannot be determined whether all pixels maintain a gradation or not by only looking at average values of the color signal values obtained from a color region (gray patch) CP in each gradation level. According to this embodiment, a histogram of color signal values is extracted when representative color signal values are extracted from a color region CP in each gradation level, whereby it is confirmed whether gradation maintain ability of all pixels in each gradation level is assured.

The operator can certainly grasp within a short time in which rate inversion of gradation occurs between gradation levels only by referring to the display of histograms on the display 30, so as to highly accurately check gradation maintainability of the color scanner 60.

[5] Others

Note that the present invention is not limited to the above embodiment, but may be modified in various ways without departing from the scope of the invention.

For example, in the above embodiment, when color signal values are extracted, visual determination based a display of the color signal value extracting region E (steps S15 and S16 in FIG. 2) and determination based on characteristic values (steps S14 and S17 in FIG. 2) are both performed. However, the processes at steps S15, S16, S18 and S19 in FIG. 2 may be omitted, and only determination based on characteristic values (steps S14 and S17) may be performed. Alternatively, the processes at steps S14 and S17 may be omitted, and only visual determination based on display of the color signal value extracting region E (steps S15 and S16) may be performed. In both cases, the similar functions and effects to the above can be provided.

In the above embodiment, the color transformation table creating method of this invention is applied when a color transformation table for the color scanner 60 or the color printer 80 is created. However, the color transformation table creating method of this invention may be applied when color transformation tables for various color input/output devices in the similar manner to the above, providing the similar functions and effects to the above.

Similarly, according to this embodiment, the gradation maintainability checking method of this invention is applied when gradation maintainability of the color scanner 60 is checked. However, the gradation maintainability checking method may be applied when gradation maintainability of various color input/output devices in the similar manner to the above, providing the similar functions and effects to the above.

The color signal value extracting method of this invention may be also applied when characteristics of various color input/output devices are measured and checked, not only when a color transformation table is created or when gradation maintainability of a color input/output device is checked, providing the similar functions and effects to the above.

What is claimed is:

1. A method for extracting at least one representative color signal value representing each color region from each of a plurality of color regions in a color chart image comprising the steps of:

a region deciding step of deciding a color signal value extracting region for each color region of said color chart image;

an extracting step of calculating said representative color signal value of said color region on the basis of color signal values in said color signal value extracting region and extracting the same;

a displaying step of displaying said color signal value extracting region along with said color chart image on a display unit; and a determining step of determining correctness of said representative color signal value on the basis of said color signal value extracting region and said color chart image which are displayed on said display unit.

2. A method for extracting at least one representative color signal value representing each color region from each of a plurality of color regions in a color chart image comprising the steps of:

a region deciding step of deciding a color signal value extracting region of each color region of said color chart image;

an extracting step of calculating said representative color signal value of said color region on the basis of color signal values in said color signal value extracting region and extracting the same;

a characteristic value calculating step of calculating at least one characteristic value for determining correctness of said representative color signal value, on the basis of color signal values in said color signal value extracting region; and a determining step of determining correctness of said representative color signal value on the basis of said characteristic value.

3. A method for extracting at least one representative color signal value representing each color region from each of a plurality of color regions in a color chart image comprising the steps of:

a region deciding step of deciding a color signal value extracting region for each color region of said color chart image;

an extracting step of calculating said representative color signal value of said color region on the basis of color signal values in said color signal value extracting region and extracting the same;

a characteristic value calculating step of calculating at least one characteristic value for determining correctness of said representative color signal value, on the basis of color signal values in said color signal value extracting region;

a displaying step of displaying said color signal value extracting region along with said color chart image on a display unit; and a determining step of determining correctness of said representative color signal value on the basis of said color signal value extracting region and said color chart image which are displayed on said display unit, and said characteristic value.

4. The color signal value extracting method according to claim 3 further comprising a coordinate designating step of designating coordinates of said color chart image before said region deciding step;

wherein, at said region deciding step, said color signal value extracting region is decided on the basis of said coordinates designated at said coordinate designating step.

5. An apparatus for extracting at least one representative color signal value representing each color region from each of a plurality of color regions in a color chart image comprising:

a display unit for displaying various information;

a region decision unit for deciding a color signal value extracting region for each color region of said color chart image;

an extraction unit for calculating said representative color signal value of said color region on the basis of color signal values in said color signal value extracting region and extracting the same; and a display control unit for making said display unit display said color signal value extracting region along with said color chart image.

6. An apparatus for extracting at least one representative color signal value representing each color region from each of a plurality of color regions in a color chart image comprising:

a region decision unit for deciding a color signal value extracting region for each color region of said color chart image;

an extraction unit for calculating said representative color signal value of said color region on the basis of color signal values in said color signal value extracting region and extracting the same;

a characteristic value calculation unit for calculating at least one characteristic value for determining correctness of said representative color signal value, on the basis of color signal values in said color signal value extracting region; and a determination unit for determining correctness of said representative color signal value on the basis of said characteristic value.

7. An apparatus for extracting at least one representative color signal value representing each color region from each of a plurality of color regions in a color chart image comprising:

a display unit for displaying various information;

a region decision unit for deciding a color signal value extracting region for each color region of said color chart image;

an extraction unit for calculating said representative color signal value of said color region on the basis of color signal values in said color signal value extracting region and extracting the same;

a characteristic value calculation unit for calculating at least one characteristic value for determining correctness of said representative color signal value, on the basis of color signal values in said color signal value extracting region;

a display control unit for making said display unit display said color signal value extracting region along with said color chart image; and a determination unit for determining correctness of said representative color signal value on the basis of said characteristic value.

8. A computer readable record medium storing a color signal value extracting program for realizing a function of extracting at least one representative color signal value representing each color region from each of a plurality of color regions in a color chart image by a computer;

said color signal value extracting program making said computer function as:

a region decision unit for deciding a color signal value extracting region for each color region of said color chart image;

an extraction unit for calculating said representative color signal value of said color region on the basis of color signal values in said color signal value extracting region and extracting the same; and a display control unit for making a display unit display said color signal value extracting region along with said color chart image.

9. A computer readable record medium storing a color signal value extracting program for making a computer realize a function of extracting at least one representative color signal value representing each color region from each of a plurality of color regions in a color chart image;

said color signal value extracting program making said computer function as:

a region decision unit for deciding a color signal value extracting region for each color region of said color chart image;

an extraction unit for calculating said representative signal value of said color region on the basis of color signal values in said color signal value extracting region and extracting the same;

a characteristic value extraction unit for calculating at least one characteristic value for determining correctness of said representative color signal value, on the basis of color signal values in said color signal value extracting region; and a determination unit for determining correctness of said representative color signal value on the basis of said characteristic value.

10. A computer readable record medium storing a color signal value extracting program to make a computer realize a function of extracting at least one representative color signal value representing each color region from each of a plurality of color regions in a color chart image;

said color signal value extracting program making said computer function as:

a region decision unit for deciding a color signal value extracting region for each color region in said color chart image;

an extraction unit for calculating said representative color signal value of said color region on the basis of color signal values in said color signal value extracting region and extracting the same;

a characteristic value calculation unit for calculating at least one characteristic value for determining correctness of said representative color signal value, on the basis of color signal values in said color signal value extracting region;

a display control unit for making a display unit display said color signal value extracting region along with said color chart image; and a determination unit for determining correctness of said representative color signal value on the basis of said characteristic value.

11. A method for creating a color transformation table for a color input device comprising the steps of:

a color chart reading step of reading a predetermined color chart by said color input device;

a color signal value extracting step of extracting at least one representative color signal representing each color region from each of a plurality of color regions in a color chart image read at said color chart reading step;

a colorimetric step of measuring a color in each of a plurality of color regions in said predetermined color chart; and a color transformation table creating step of correlating said representative color signal value extracted at said color signal value extracting step with at least one colorimetric value measured at said colorimetric step in each color region to create said color transformation table for said color input device;

said color signal value extracting step comprising:

a region deciding step of deciding a color signal value extracting region for each color region of said color chart image;

an extracting step of calculating said representative color signal value of said color region on the basis of color signal values in said color signal value extracting region and extracting the same;

a displaying step of making a display unit display said color signal value extracting region along with said color chart image; and a determining step of determining correctness of said representative color signal value on the basis of said color signal value extracting region and said color chart image which are displayed on said display unit.

12. A method for creating a color transformation table for a color input device comprising the steps of:

a color chart reading step of reading a predetermined color chart by said color input device;

a color signal value extracting step of extracting at least one representative color signal value representing each color region from each of a plurality of color regions in a color chart image read at said color chart reading step;

a colorimetric step of measuring a color in each of a plurality of color regions in said predetermined color chart; and a color transformation table creating step of correlating said representative color signal value extracted at said color signal value extracting step with at least one colorimetric value measured at said colorimetric step in each color region to create said color transformation table for said color input device;

said color signal value extracting step comprising:

a region deciding step of deciding a color signal value extracting region for each color region of said color chart image;

an extracting step of calculating said representative color signal value of said color region on the basis of color signal values in said color signal value extracting region and extracting the same;

a characteristic value calculating step of calculating at least one characteristic value for determining correctness of said representative color signal value, on the basis of color signal values in said color signal value extracting region; and a determining step of determining correctness of said representative color signal value on the basis of said characteristic value.

13. A method for creating a color transformation table for a color input device comprising the steps of:

a color chart reading step of reading a predetermined color chart by said color input device;

a color signal value extracting step of extracting at least one representative color signal value representing each color region from each of a plurality of color regions in a color chart image read at said color chart reading step;

a colorimetric step of measuring a color in each of a plurality of color regions in said predetermined color chart; and a color transformation table creating step of correlating said representative color signal value extracted at said color signal value extracting step with at least one colorimetric value measured at said colorimetric step in each color region to create said color transformation table for said color input device;

said color signal value extracting step comprising:

a region deciding step of deciding a color signal value extracting region for each color region in said color chart image;

an extracting step of calculating said representative color signal value of said color region on the basis of color signal values in said color signal value extracting region and extracting the same;

a characteristic value calculating step of calculating at least one characteristic value for determining correctness of said representative color signal value, on the basis of color signal values in said color signal value extracting region;

a displaying step of making a display unit display said color signal value extracting region along with said color chart image; and a determining step of determining correctness of said representative color signal value on the basis of said color signal value extracting region and said color chart image which are displayed on said display unit, and said characteristic value.

14. An apparatus for creating a color transformation table for a color input device comprising:

a display unit for displaying various information;

a color signal value extraction unit for extracting at least one representative color signal value representing each color region from each of a plurality of color regions in a color chart image obtained by reading a predetermined color chart by said color input device;

a colorimeter for measuring a color of each of a plurality of color regions in said predetermined color chart; and a color transformation table creation unit for correlating said representative color signal value extracted by said color signal value extraction unit with at least one colorimetric value measured by said colorimeter in each color region to create said color transformation table for said color input device;

said color signal value extraction unit comprising:

a region decision unit for deciding a color signal value extracting region for each color region of said color chart image;

an extraction unit for calculating said representative color signal value of said color region on the basis of color signal values in said color signal value extracting region and extracting the same; and a display control unit for making said display unit displays said color signal value extracting region along with said color chart image.

15. An apparatus for creating a color transformation table for a color input device comprising:

a color signal value extraction unit for extracting at least one representative color signal value representing each color region from each of a plurality of color regions in a color chart image obtained by reading a predetermined color chart by said color input device;

a colorimeter for measuring a color in each of a plurality of color regions in said predetermined color chart; and a color transformation table creation unit for correlating said representative color signal value extracted by said color signal value extraction unit with at least one colorimetric value measured by said colorimeter in each color region to create said color transformation table for said color input device;

said color signal value extraction unit comprising:

a region decision unit for deciding a color signal value extracting region for each color region of said color chart image;

an extraction unit for calculating said representative color signal value in said color region on the basis of color signal values in said color signal value extracting region and extracting the same;

a characteristic value calculation unit for calculating at least one characteristic value for determining correctness of said representative color signal value, on the basis of color signal values in said color signal value extracting region; and a determination unit for determining correctness of said representative color signal value on the basis of said characteristic value.

16. An apparatus for creating a color transformation table for a color input device comprising:

a display unit for displaying various information;

a color signal value extraction unit for extracting at least one representative color signal value representing each color region from each of a plurality of color regions in a color chart image obtained by reading a predetermined color chart by said color input device;

a colorimeter for measuring a color of each of a plurality of color regions in said predetermined color chart; and a color transformation table creation unit for correlating said representative color signal value extracted by said color signal value extraction unit with at least one colorimetric value measured by said colorimeter in each color region to create said color transformation table for said color input device;

said color signal value extraction unit comprising:

a region decision unit for deciding a color signal value extracting region for each color region of said color chart image;

an extraction unit for calculating said representative color signal value of said color region on the basis of color signal values in said color signal value extracting region and extracting the same;

a characteristic value calculation unit for calculating at least one characteristic value for determining correctness of said representative color signal value, on the basis of color signal values in said color signal value extracting region;

a display control unit for making said display unit display said color signal value extracting region along with said color chart image; and a determination unit for determining correctness of said representative color signal value on the basis of said characteristic value.

17. A computer readable record medium in which a color transformation table creating program for making a computer realize a function of creating a color transformation table for a color input device is recorded;

said color transformation table creating program making said computer function as:

a color signal value extraction unit for extracting at least one representative color signal value representing each color region from each of a plurality of color regions in a color chart image obtained by reading a predetermined color chart by said color input device; and a color transformation table creation unit for correlating at least one colorimetric value of each of a plurality of color regions in said predetermined color chart with said representative color signal value extracted by said color signal value extraction unit in each color region to create said color transformation table for said color input device;

when said computer is made function as said color signal value extraction unit, said color transformation table creating program making said computer function as:

a region decision unit for deciding a color signal extracting region for each color region of said color chart image;

an extraction unit for calculating said representative color signal value of said color region on the basis of color signal values in said color signal value extracting region and extracting the same; and a display control unit for making a display unit display said color signal value extracting region along with said color chart image.

18. A computer readable record medium in which a color transformation table creating program for making a computer realize a function of creating a color transformation table for a color input device is recorded;

said color transformation table creating program making said computer function as:
- a color signal value extraction unit for extracting at least one representative color signal value representing each color region from each of a plurality of color regions in a color chart image obtained by reading a predetermined color chart by said color input device; and
- a color transformation table creation unit for correlating at least one colorimetric value of each of a plurality of color regions in said predetermined color chart with said representative color signal value extracted by said color signal value extraction unit in each color region to create said color transformation table for said color input device;

when said computer is made function as said color signal value extraction unit, said color transformation table creating program making said computer function as:
- a region decision unit for deciding a color signal value extracting region for each color region of said color chart image;
- an extraction unit for calculating said representative color signal value of said color region on the basis of color signal values in said color signal value extracting region and extracting the same;
- a characteristic value calculation unit for calculating at least one characteristic value for determining correctness of said representative color signal value, on the basis of color signal values in said color signal value extracting region; and
- a determination unit for determining correctness of said representative color signal value on the basis of said characteristic value.

19. A computer readable record medium in which a color transformation table creating program for making a computer realize a function of creating a color transformation table for a color input device is recorded;

said color transformation table creating program making said computer function as:
- a color signal value extraction unit for extracting at least one representative color signal value representing each color region from each of a plurality of color regions in a color chart image obtained by reading a predetermined color chart by said color input device; and
- a color transformation table creation unit for correlating at least one colorimetric value of each of a plurality of color regions in said predetermined color chart with said representative color signal value extracted by said color signal value extraction unit in each color region to create said color transformation table for said color input device;

when said computer is made function as said color signal value extraction unit, said color transformation table creating program making said computer function as:
- a region decision unit for deciding a color signal value extracting region for each color region of said color chart image;
- an extraction unit for calculating said representative color signal value of said color region on the basis of color signal values in said color signal value extracting region and extracting the same;
- a characteristic value calculation unit for calculating at least one characteristic value for determining correctness of said representative color signal value, on the basis of color signal values in said color signal value extracting region;
- a display control unit for making a display unit display said color signal value extracting region along with said color chart image; and
- a determination unit for determining correctness of said representative color signal value on the basis of said characteristic value.

20. A method for creating a color transformation table for a color output device comprising the steps of:
- a color chart outputting step of giving predetermined color signal values to said color output device to make said color output device output a predetermined color chart;
- a color chart reading step of reading said predetermined color chart by a color input device;
- a color transforming step of transforming a color chart image read at said color chart reading step into an image expressed in a device-independent color space on the basis of a color transformation table for said color input device;
- a color signal value extracting step of extracting at least one representative color signal value representing each color region from each of a plurality of color regions in said color chart image transformed at said color transforming step; and
- a color transformation table creating step of correlating said predetermined color signal value given to said color output device at said color chart outputting step with said representative color signal value extracted at said color signal value extracting step in each color region to create said color transformation table for said color output device.

21. A method for creating a color transformation table for a color output device comprising the steps of:
- a color chart outputting step of giving predetermined color signal values to said color output device to make said color output device output a predetermined color chart;
- a color chart reading step of reading said predetermined color chart by a color input device;
- a color signal value extracting step of extracting at least one representative color signal value representing each color region from each of a plurality of color regions in a color chart image read at said color chart reading step;
- a color transforming step of transforming said representative color signal value extracted at said color signal value extracting step into at least one color signal value expressed in a device-independent color space on the basis of a color transformation table for said color input device; and
- a color transformation table creating step of correlating said predetermined color signal value given to said color output device at said color chart outputting step with said representative color signal value transformed at said color transforming step in each color region to create said color transformation table for said color output device.

22. An apparatus for creating a color transformation table for a color output device comprising:
- a color signal value giving unit for giving predetermined color signal values to said color output device in order to make said color output device output a predetermined color chart;

a color input device for reading said predetermined color chart outputted from said color output device;

a color transformation unit for transforming a color chart image read by said color input device into an image expressed in a device-independent color space on the basis of a color transformation table for said color input device;

a color signal value extraction unit for extracting at least one representative color signal value representing each color region from each of a plurality of color regions in said color chart image transformed by said color transformation unit; and a color transformation table creation unit for correlating said predetermined color signal value given to said color output device with said representative color signal value extracted by said color signal value extraction unit in each color region to create said color transformation table for said color output device.

23. An apparatus for creating a color transformation table for a color output device comprising:

a color signal value giving unit for giving predetermined color signal values to said color output device in order to make said color output device output a predetermined color chart;

a color input device for reading said predetermined color chart outputted from said color output device;

a color signal value extraction unit for extracting at least one representative color signal value representing each color region from each of a plurality of color regions in a color chart image read by said color input device;

a color transformation unit for transforming said representative color signal value extracted by said color signal value extraction unit into at least one color signal value expressed in a device-independent color space on the basis of a color transformation table for said color input device; and a color transformation table creation unit for correlating said predetermined color signal value given to said color output device with said representative color signal value transformed by said color transformation unit in each color region to create said color transformation table for said color output device.

24. A computer readable record medium in which a color transformation table creating program for making a computer realize a function of creating a color transformation table for a color output device is recorded;

said color transformation table creating program making said computer function as:

a color signal value giving unit for giving predetermined color signal values to said color output device in order to make said color output device output a predetermined color chart;

a color transformation unit for transforming a color chart image obtained by reading said predetermined color chart, which is outputted from said color output device, by said color input device into an image expressed in a device-independent color space on the basis of a color transformation table for said color input device;

a color signal value extraction unit for extracting at least one representative color signal value representing each color region from each of a plurality of color regions in said color chart image transformed by said color transformation unit; and a color transformation table creation unit for correlating said predetermined color signal value given to said color output device with said representative color signal value extracted by said color signal value extraction unit in each color region to create said color transformation table for said color output device.

25. A computer readable record medium in which a color transformation table creating program for making a computer realize a function of creating a color transformation table for a color output device is recorded;

said color transformation table creating program making said computer function as:

a color signal value giving unit for giving predetermined color signal values to said color output device in order to make said color output device output a predetermined color chart;

a color signal value extraction unit for extracting at least one representative color signal value representing each color region from each of a plurality of color regions in a color chart image obtained by reading said predetermined color chart, which is outputted from said color output device, by said color input device;

a color transformation unit for transforming said representative color signal value extracted by said color signal value extraction unit into at least one color signal value expressed in a device-independent color space on the basis of a color transformation table for said color input device; and a color transformation table creation unit for correlating said predetermined color signal value given to said color output device with said representative color signal value transformed by said color transformation unit in each color region to create said color transformation table for said color output device.

26. A method for checking gradation maintainability of a color input device comprising the steps of:

a color chart reading step of reading a predetermined color chart by said color input device;

a color signal value extracting step of extracting at least one representative color signal value representing each color region from each of a plurality of color regions configuring gradations in a color chart image read at said color chart reading step; and a checking step for checking gradation maintain ability of said color input device on the basis of said representative color signal value extracted at said color signal value extracting step;

said color signal value extracting step comprising:

a region deciding step of deciding a color signal value extracting region for each color region of said color chart image;

an extracting step of calculating said representative color signal value of said color region on the basis of color signal values in said color signal value extracting region and extracting the same;

a displaying step of making a display unit display said color signal value extracting region along with said color chart image; and a determining step of determining correctness of said representative color signal value on the basis of said color signal value extracting region and said color chart image which are displayed on said display unit.

27. A method for checking gradation maintainability of a color input device comprising the steps of:

a color chart reading step of reading a predetermined color chart by said color input device;

a color signal value extracting step of extracting at least one representative color signal value representing each color region from each of a plurality of color regions configuring gradations in a color chart image read at said color chart reading step; and a checking step of checking gradation maintainability of said color input device on the basis of said representative color signal value extracted at said color signal value extracting step;

said color signal value extracting step comprising:
  a region deciding step of deciding a color signal value extracting region for each color region of said color chart image;
  an extracting step of calculating said representative color signal value of said color region on the basis of color signal values in said color signal value extracting region and extracting the same;
  a characteristic value calculating step of calculating at least one characteristic value for determining correctness of said representative color signal value, on the basis of color signal values in said color signal value extracting region; and
  a determining step of determining correctness of said representative color signal value on the basis of said characteristic value.

28. A method for checking gradation maintainability of a color input device comprising the steps of:
  a color chart reading step of reading a predetermined color chart by said color input device;
  a color signal value extracting step of extracting at least one representative color signal value representing each color region from each of a plurality of color regions configuring gradations in a color chart image read at said color chart reading step; and
  a checking step of checking gradation maintain ability of said color input device on the basis of said representative color signal value extracted at said color signal value extracting step;

said color signal value extracting step comprising:
  a region deciding step of deciding a color signal value extracting region for each color region of said color chart image;
  an extracting step of calculating said representative color signal value of said color region on the basis of color signal values in said color signal value extracting region and extracting the same;
  a characteristic value calculating step of calculating at least one characteristic value for determining correctness of said representative color signal value, on the basis of color signal values in said color signal value extracting region;
  a displaying step of making a display unit display said color signal value extracting region along with said color chart image; and
  a determining step of determining correctness of said representative color signal value on the basis of said color signal value extracting region and said color chart image which are displayed on said display unit, and said characteristic value.

29. An apparatus for checking gradation maintainability of a color input device comprising:
  a display unit for displaying various information;
  a color signal value extraction unit for extracting at least one representative color signal value representing each color region from each of a plurality of color regions configuring gradations in a color chart image obtained by reading a predetermined color chart by said color input device; and
  a check unit for checking gradation maintain ability of said color input device on the basis of said representative color signal value extracted by said color signal value extraction unit;

said color signal value extraction unit comprising:
  a region decision unit for deciding a color signal value extracting region for each color region in said color chart image;
  an extraction unit for calculating said representative color signal value of said color region on the basis of color signal values in said color signal value extracting region and extracting the same; and
  a display control unit for making said display unit display said color signal value extraction region along with said color chart image.

30. An apparatus for checking gradation maintainability of a color input device comprising:
  a color signal value extraction unit for extracting at least one representative color signal value representing each color region from each of a plurality of color regions configuring gradation in a color chart image obtained by reading a predetermined color chart by said color input device; and
  a check unit for checking gradation maintainability of said color input device on the basis of said representative color signal value extracted by said color signal value extraction unit;

said color signal value extraction unit comprising:
  a region decision unit for deciding a color signal value extracting region for each color region of said color chart image;
  an extraction unit for extracting said representative color signal value of said color region on the basis of color signal values in said color signal value extracting region and extracting the same;
  a characteristic value calculation unit for calculating at least one characteristic value for determining correctness of said representative color signal value, on the basis of color signal values in said color signal value extracting region; and
  a determination unit for determining correctness of said representative color signal value on the basis of said characteristic value.

31. An apparatus for checking gradation maintainability of a color input device comprising:
  a display unit for displaying various information;
  a color signal value extraction unit for extracting at least one representative color signal value representing each color region from each of a plurality of color regions configuring gradations in a color chart image obtained by reading a predetermined color chart by said color input device; and
  a check unit for checking gradation maintainability of said color input device on the basis of said representative color signal value extracted by said color signal value extraction unit;

said color signal value extraction unit comprising:
  a region decision unit for deciding a color signal value extracting region for each color region of said color chart image;
  an extraction unit for calculating said representative color signal value of said color region on the basis of color signal values in said color signal value extracting region and extracting the same;

a characteristic value calculation unit for calculating at least one characteristic value for determining correctness of said representative color signal value, on the basis of color signal values in said color signal value extracting region;

a display control unit for making said display unit displays said color signal value extracting region along with said color chart image; and a determination unit for determining correctness of said representative color signal value on the basis of said characteristic value.

32. A computer readable record medium in which a gradation maintainability checking program for making a computer realize a function of checking gradation maintainability of a color input device is recorded;

said gradation maintainability checking program making said computer function as:

a color signal value extraction unit for extracting at least one representative color signal value representing each color region from each of a plurality of color regions configuring gradations in a color chart image obtained by reading a predetermined color chart by said color input device; and a check unit for checking gradation maintain ability of said color input device on the basis of said representative color signal value extracted by said color signal value extraction unit;

when said computer is made function as said color signal value extraction unit, said gradation maintainability checking program making said computer function as:

a region decision unit for deciding a color signal value extracting region for each color region of said color chart image;

an extraction unit for calculating said representative color signal value of said color region on the basis of color signal values in said color signal value extracting region and extracting the same; and a display control unit for making a display unit display said color signal value extracting region along with said color chart image.

33. A computer readable record medium in which a gradation maintainability checking program for making a computer realize a function of checking gradation maintainability of a color input device is recorded;

said gradation maintainability checking program making said computer function as:

a color signal value extraction unit for extracting at least one representative color signal value representing each color region from each of a plurality of color regions configuring gradations in a color chart image obtained by reading a predetermined color chart by said color input device; and a check unit for checking gradation maintainability of said color input device on the basis of said representative color signal value extracted by said color signal value extraction unit;

when said computer is made function as said color signal value extraction unit, said gradation maintainability checking program making said computer function as:

a region decision unit for deciding a color signal value extracting region for each color region of said color chart image;

an extraction unit for calculating said representative color signal value of said color region on the basis of color signal values in said color signal value extracting region and extracting the same;

a characteristic value calculation unit for calculating at least one characteristic value for determining correctness of said representative color signal values, on the basis of color signal values in said color signal value extracting region; and a determination unit for determining correctness of said representative color signal value on the basis of said characteristic value.

34. A computer readable record medium in which a gradation maintainability checking program for making a computer realize a function of checking gradation maintainability of a color input device is recorded;

said gradation maintainability checking program making said computer function as:

a color signal value extraction unit for extracting at least one representative color signal value representing each color region from each of a plurality of color regions configuring gradations in a color chart image obtained by reading a predetermined color chart by said color input device; and a check unit for checking gradation maintainability of said color input device on the basis of said representative color signal value extracted by said color signal value extraction unit;

when said computer is made function as said color signal value extraction unit, said gradation maintainability checking program making said computer function as:

a region decision unit for deciding a color signal value extracting region for each color region of said color chart image;

an extraction unit for calculating said representative color signal value of said color region on the basis of color signal values in said color signal value extracting region and extracting the same;

a characteristic value calculation unit for calculating at least one characteristic value for determining correctness of said representative color signal values, on the basis of color signal values in said color signal value extracting region;

a display control unit for making a display unit display said color signal value extracting region along with said color chart image; and a determination unit for determining correctness of said representative color signal value on the basis of said characteristic value.

* * * * *

UNITED STATES PATENT AND TRADEMARK OFFICE
CERTIFICATE OF CORRECTION

PATENT NO. : 6,888,648 B2
DATED : May 3, 2005
INVENTOR(S) : Junichi Odagiri et al.

It is certified that error appears in the above-identified patent and that said Letters Patent is hereby corrected as shown below:

Column 41,
Line 34, change "displays" to -- display --.

Column 46,
Line 44, change "maintain ability" to -- maintainability --.

Column 47,
Line 35, change "maintain ability" to -- maintainability --.

Column 48,
Line 3, change "maintain ability" to -- maintainability --.

Column 49,
Line 7, change "displays" to -- display --.
Line 24, change "maintain ability" to -- maintainability --.

Signed and Sealed this

Twentieth Day of December, 2005

JON W. DUDAS
*Director of the United States Patent and Trademark Office*